US006940625B2

(12) United States Patent
Endo et al.

(10) Patent No.: US 6,940,625 B2
(45) Date of Patent: *Sep. 6, 2005

(54) PATTERN FORMING MEMBER APPLIED TO SECTIONING IMAGE OBSERVATION APPARATUS AND SECTIONING IMAGE OBSERVATION APPARATUS USING THEM

(75) Inventors: Tomio Endo, Hidaka (JP); Takeshi Yamagishi, Sagamihara (JP); Katsuya Sadamori, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/851,854

(22) Filed: May 20, 2004

(65) Prior Publication Data

US 2004/0212866 A1 Oct. 28, 2004

Related U.S. Application Data

(62) Division of application No. 10/002,102, filed on Nov. 2, 2001, now Pat. No. 6,747,772, which is a continuation of application No. PCT/JP01/01710, filed on Mar. 6, 2001.

(30) Foreign Application Priority Data

Mar. 6, 2000 (JP) ....................................... 2000-060578

(51) Int. Cl.[7] ................................................ G02B 26/02
(52) U.S. Cl. ........................................ 359/234; 359/385
(58) Field of Search ......................... 359/227, 234–236, 359/368, 385; 356/601, 607, 608, 603, 604

(56) References Cited

U.S. PATENT DOCUMENTS

| | | | |
|---|---|---|---|
| 5,751,417 A | 5/1998 | Uhl | |
| 6,002,509 A | 12/1999 | Wijnaendts Van Resandt et al. | |
| 6,031,517 A | 2/2000 | Van Nes | |
| 6,111,690 A | 8/2000 | Tanaami | |
| 6,144,489 A | 11/2000 | Wilson et al. | |
| 6,157,484 A | 12/2000 | Nishida | |
| 6,320,185 B1 | 11/2001 | Matsuo | |
| 6,426,835 B1 | 7/2002 | Endo et al. | |
| 6,747,772 B2 * | 6/2004 | Endo et al. | 359/234 |

FOREIGN PATENT DOCUMENTS

| | | |
|---|---|---|
| DE | 199 22 593 A1 | 11/1999 |
| DE | 199 60 583 A1 | 7/2001 |
| EP | 0 943 950 A1 | 9/1999 |
| JP | 10-48350 A | 2/1998 |
| JP | 2001-21330 A | 1/2001 |
| JP | 2001-75009 A | 3/2001 |
| WO | WO 97/31282 A1 | 8/1997 |

* cited by examiner

*Primary Examiner*—James Phan
(74) *Attorney, Agent, or Firm*—Frishauf, Holtz, Goodman & Chick, P.C.

(57) ABSTRACT

In a pattern formation member adopted to a sectioning image observation apparatus which selectively irradiates a light from a light source to a sample, scans the sample, and acquires a light from the sample as a sectioning image, the pattern formation member comprises an irradiation section and a cutoff section, each of the irradiation section and the cutoff section is in a straight pattern, and these straight patterns are disposed alternatively.

14 Claims, 23 Drawing Sheets

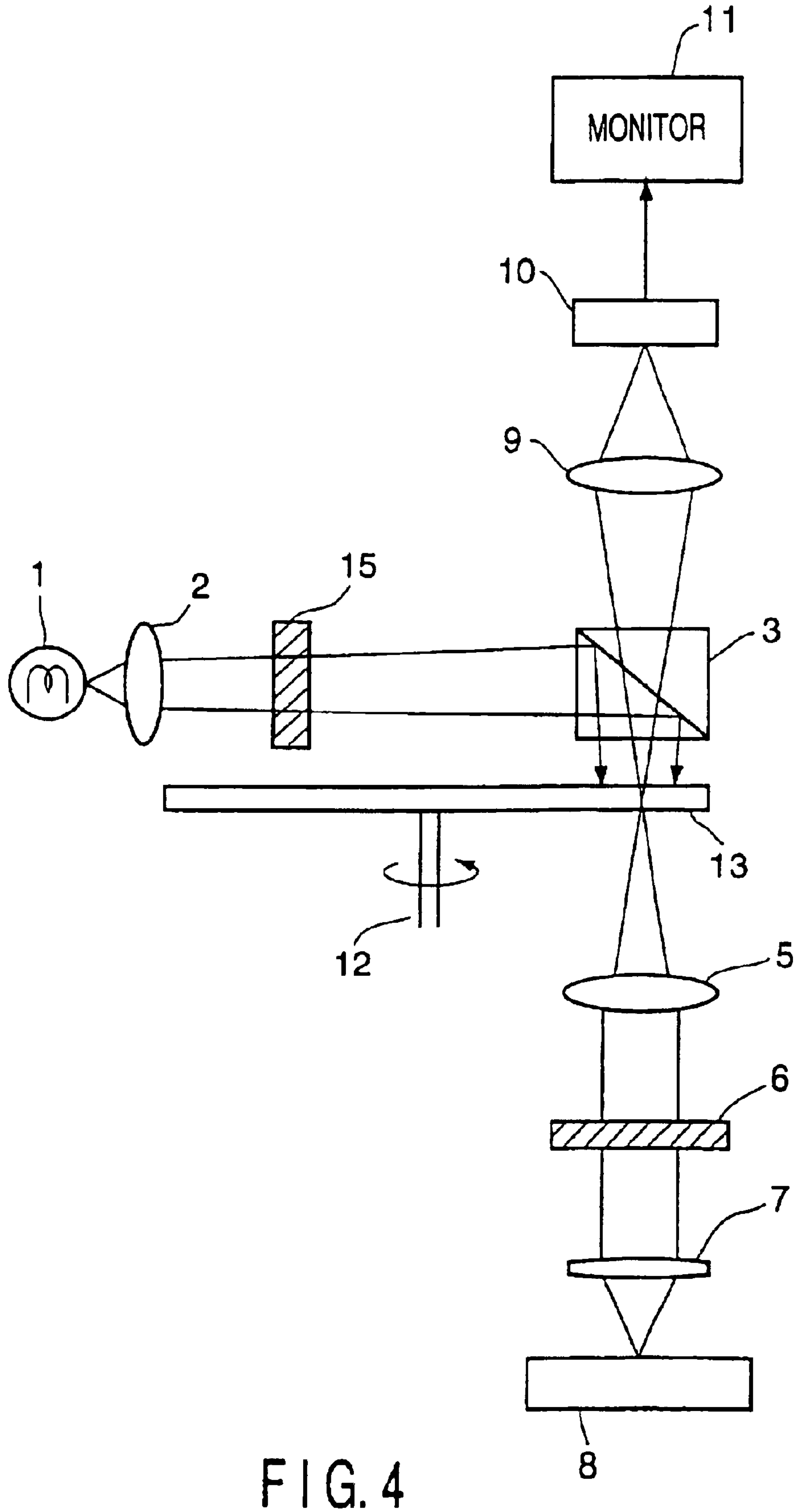
F I G. 4

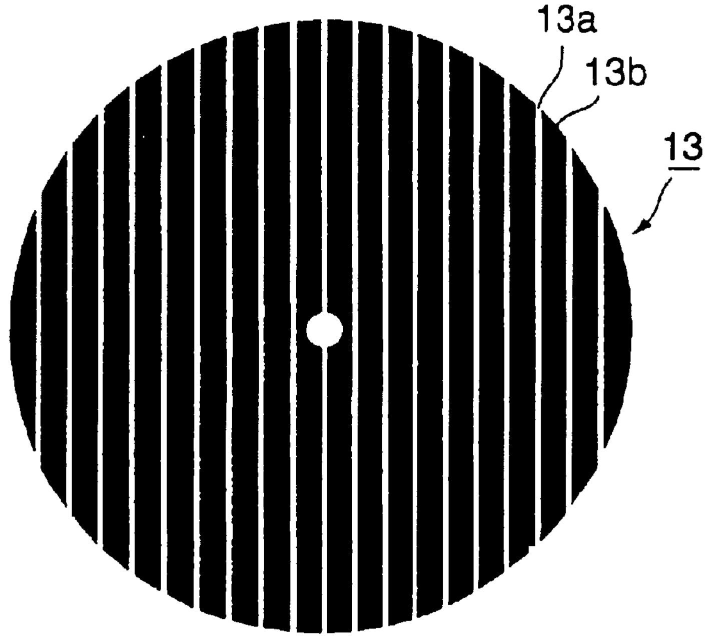
F I G. 5A
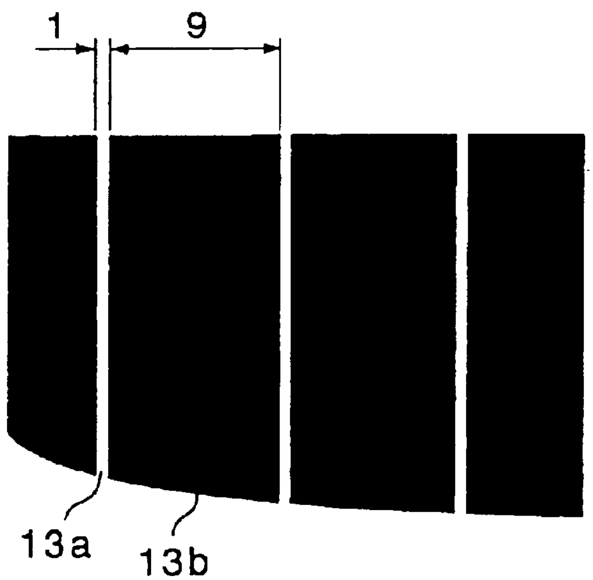
F I G. 5B

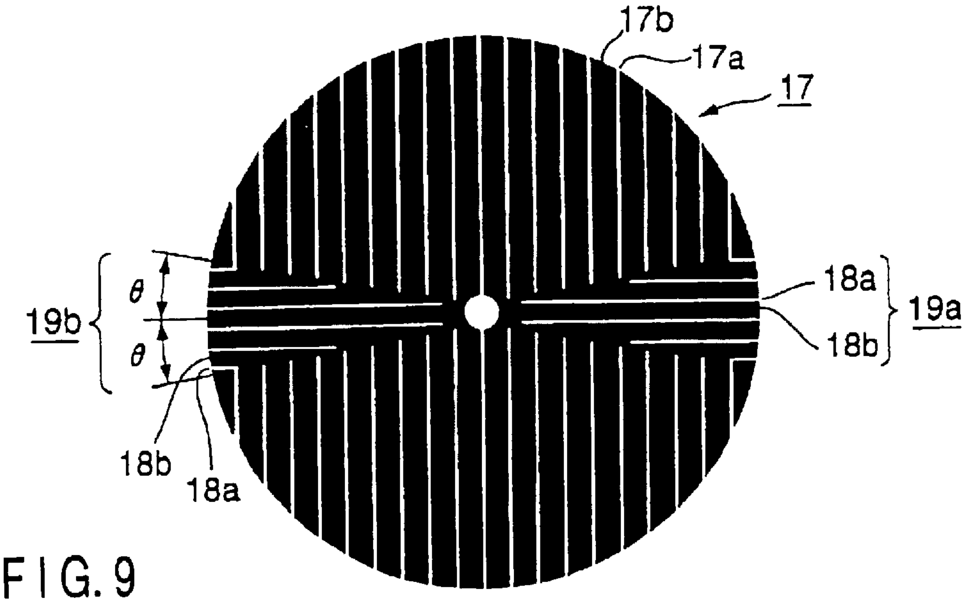
FIG. 9
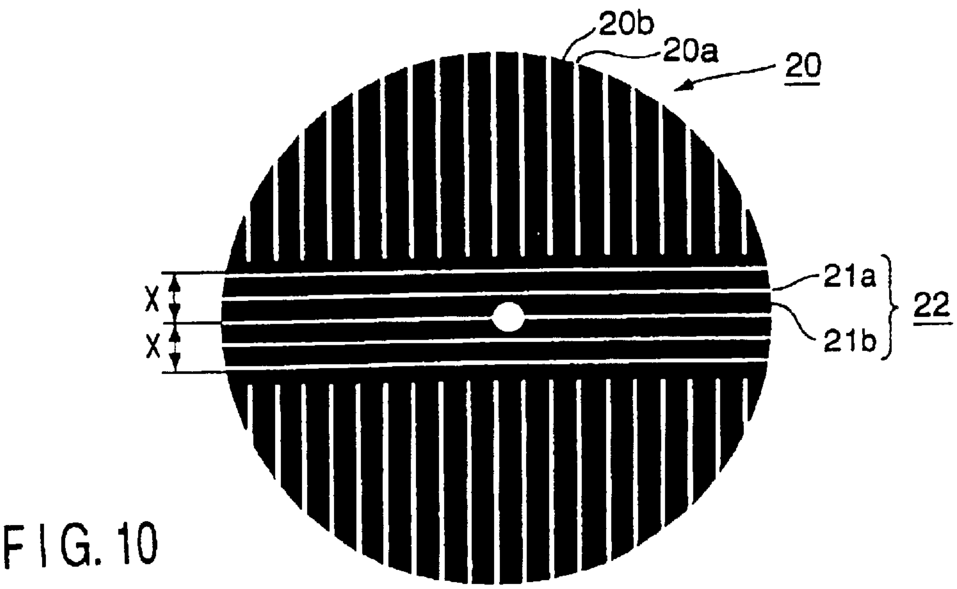
FIG. 10
| R [mm] | θ [°] | X [mm] |
|---|---|---|
| | | |
| 20 | 10.5 | 3.64471 |
| 30 | 7 | 3.65608 |
| 40 | 5.2 | 3.625303 |
| 50 | 4.2 | 3.66191 |
| 60 | 3.5 | 3.662912 |
| 70 | 3 | 3.663517 |
FIG. 11

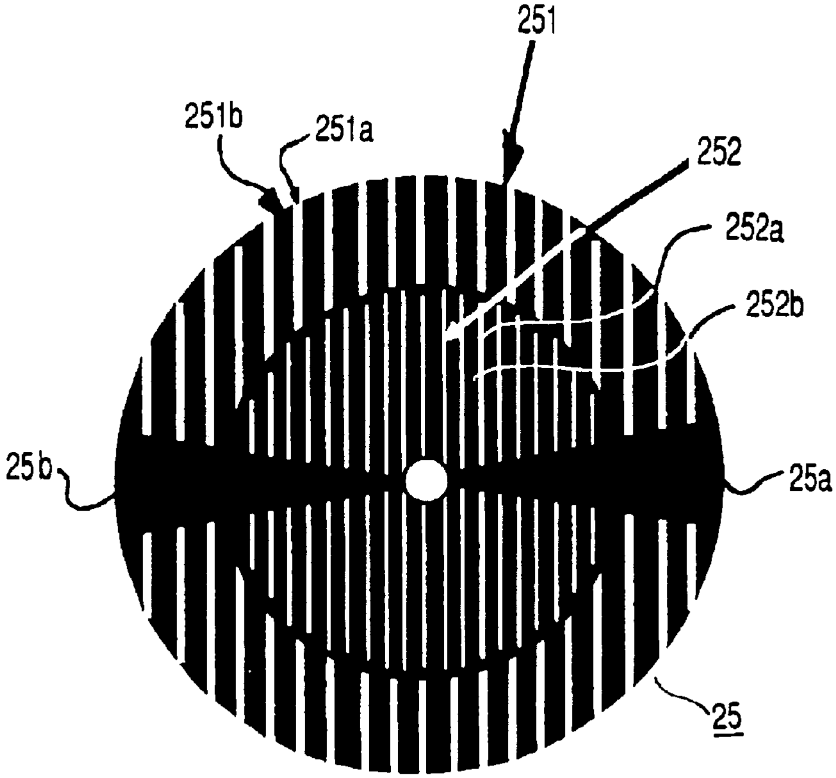
F I G. 15A
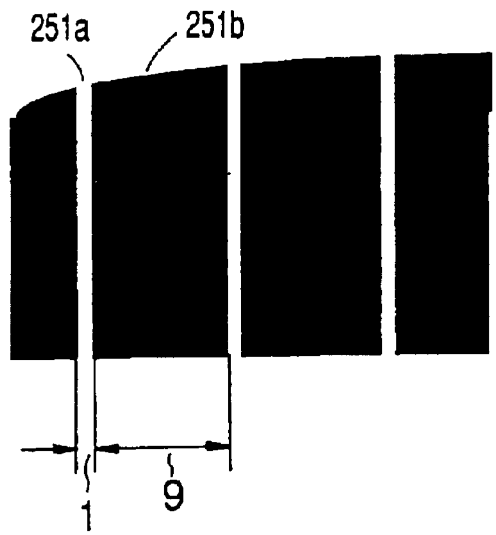
F I G. 15B

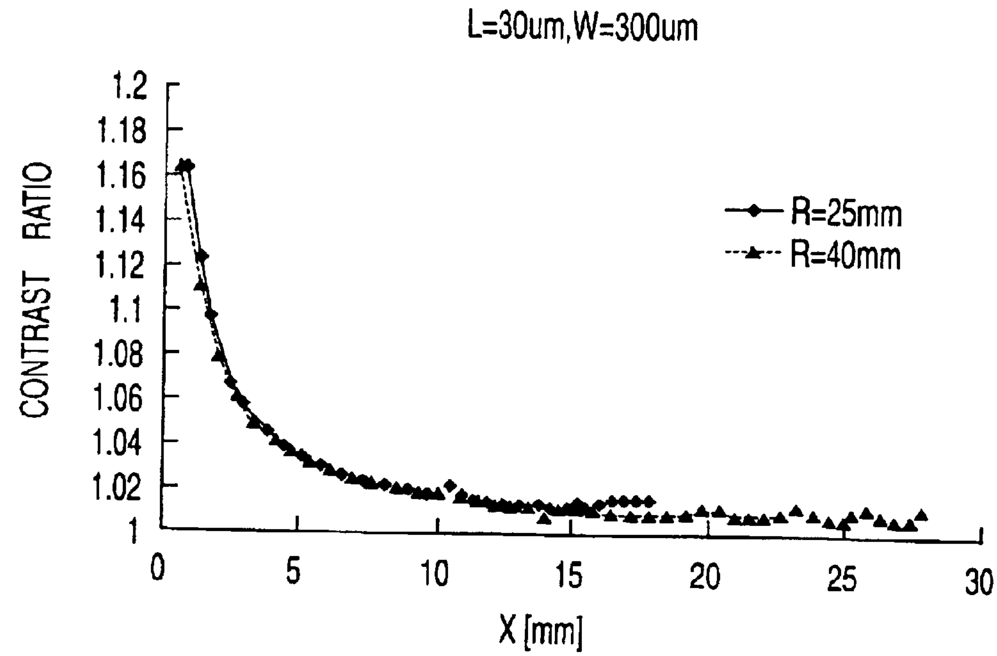
F I G. 21
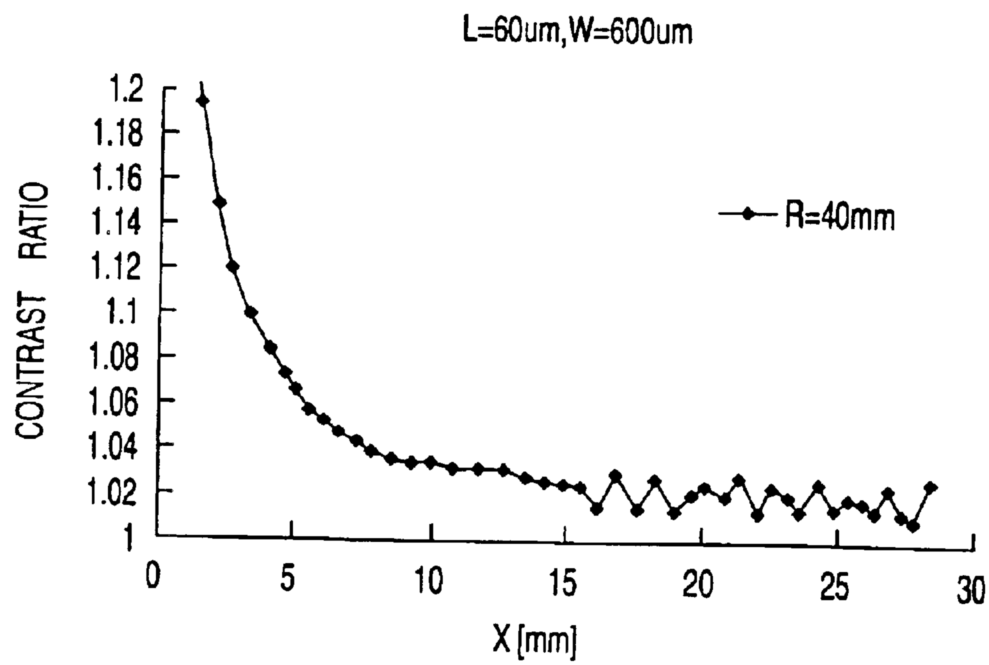
F I G. 22

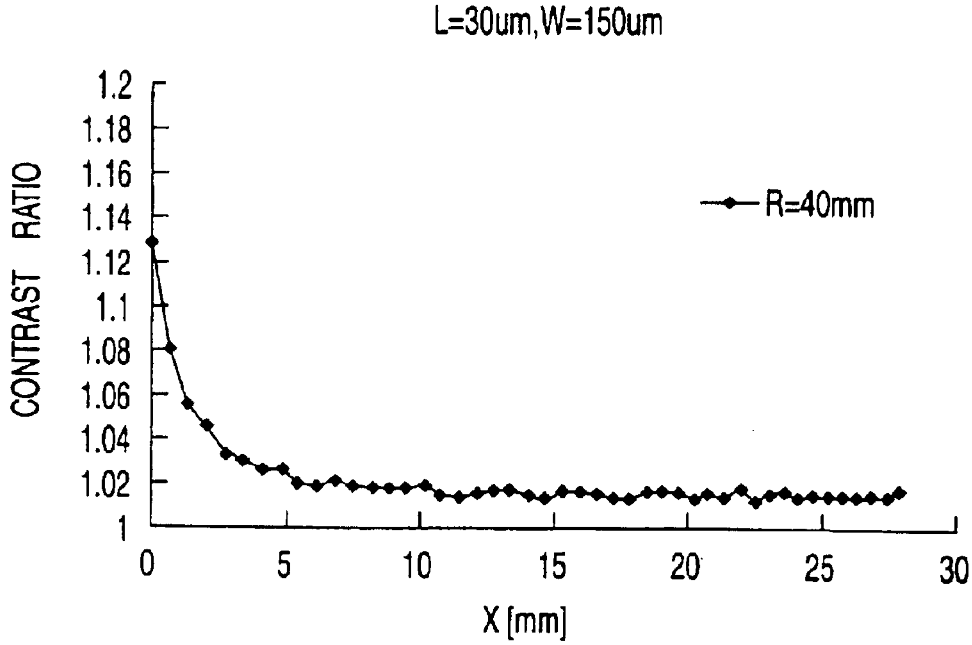
F I G . 24
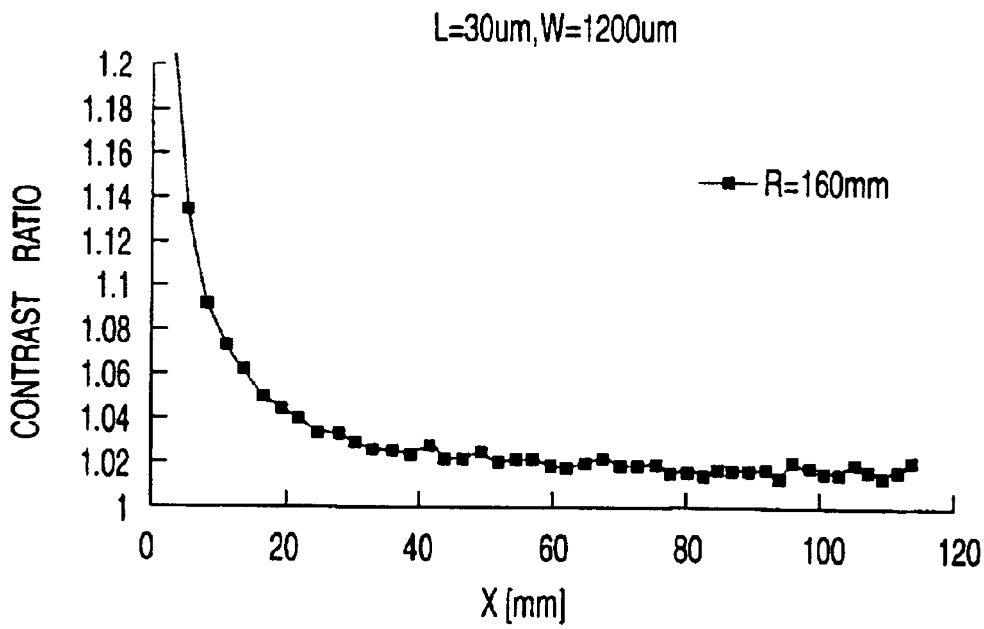
F I G . 25

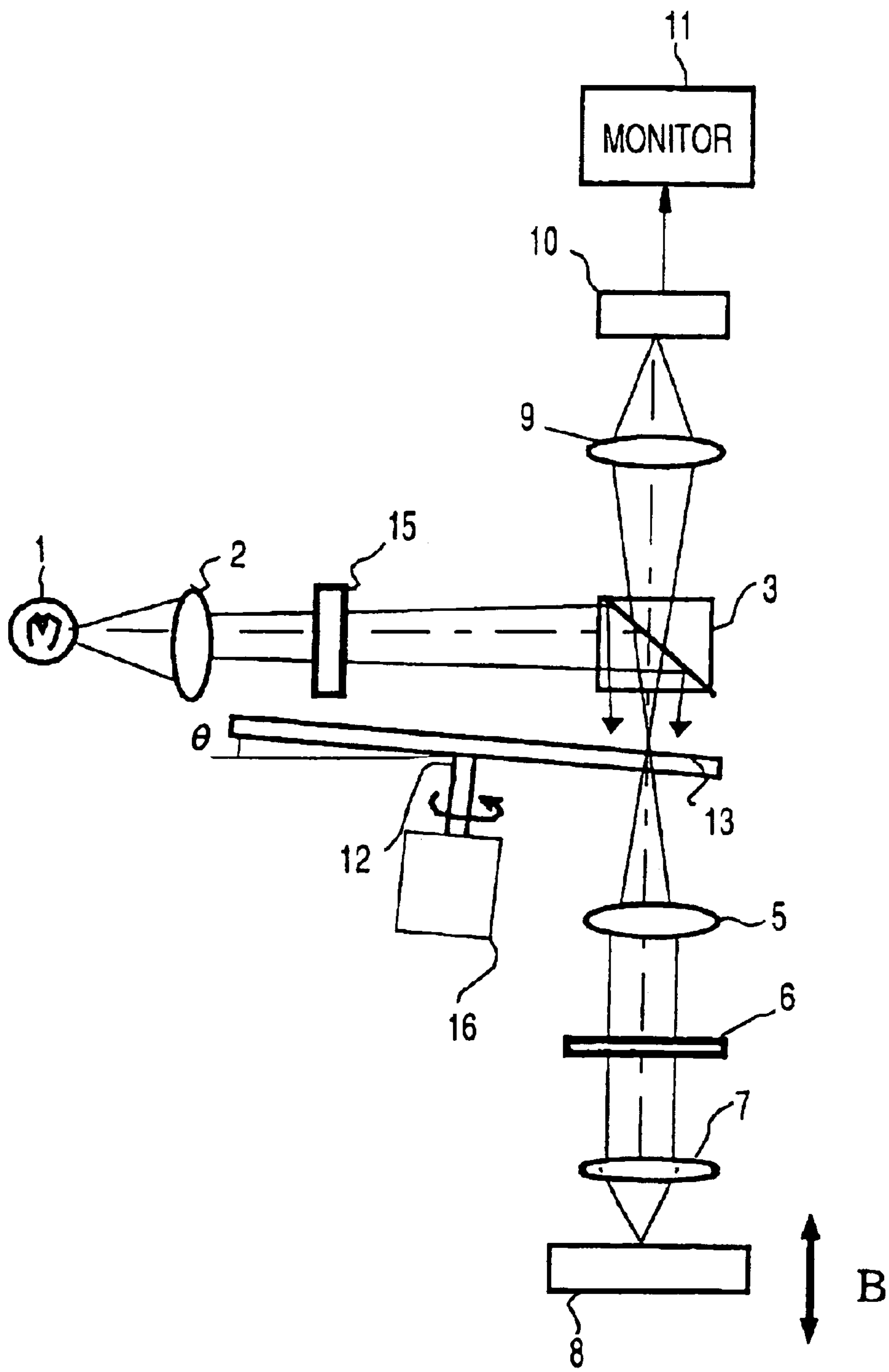
F I G. 26

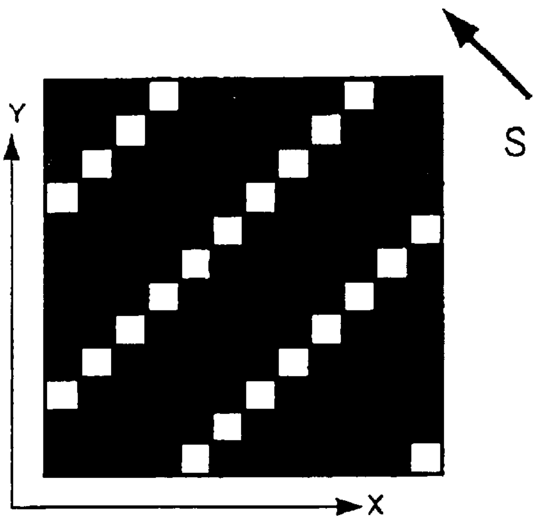
F I G. 32A
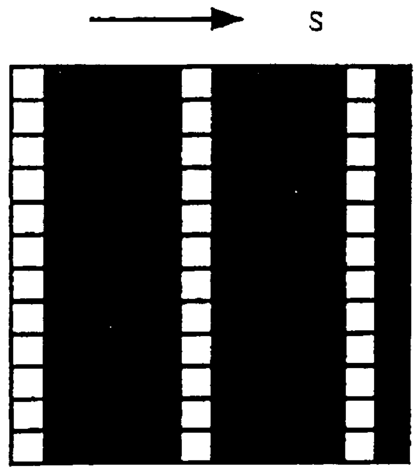
F I G. 32B
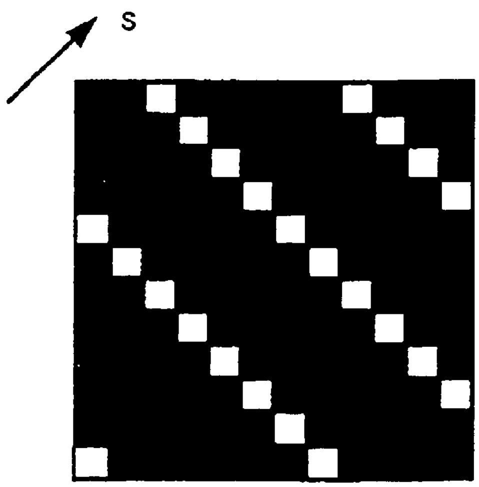
F I G. 32C
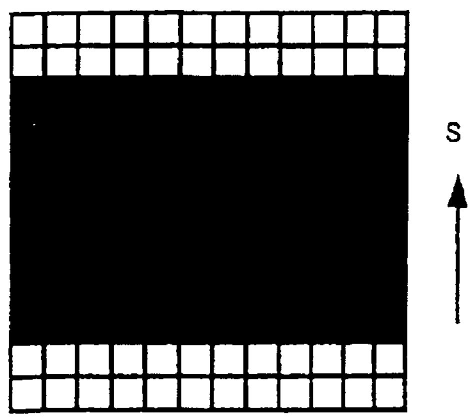
F I G. 32D

PATTERN FORMING MEMBER APPLIED TO SECTIONING IMAGE OBSERVATION APPARATUS AND SECTIONING IMAGE OBSERVATION APPARATUS USING THEM

CROSS-REFERENCE TO RELATED APPLICATIONS

This application is a Divisional of U.S. application Ser. No. 10/002,102 filed Nov. 2, 2001, now U.S Pat. No. 6,747,772 which is a Continuation Application of PCT Application No. PCT/JP01/01710, filed Mar. 6, 2001, which was not published under PCT Article 21(2) in English.

This application is based upon and claims the benefit of priority from the prior Japanese Patent Application No. 2000-060578, filed Mar. 6, 2000, the entire contents of which are incorporated herein by reference.

BACKGROUND OF THE INVENTION

1. Field of the Invention

The present invention relates to a pattern formation member applied to a sectioning image observation apparatus for observing/measuring sample microstructure or three-dimensional shape of a sample by using light and a sectioning image observation apparatus using them.

2. Description of the Related Art

Conventionally, as a sectioning image observation apparatus, a confocal microscope using a rotation disk called Nipkow rotation disk where a number of pin holes are arranged in spiral with an interval of about ten times of the pin hole diameter is known.

FIG. 1 shows the schematic configuration of a confocal microscope using such a Nipkow rotation disk, wherein a condenser lens 2 and a PBS (polarized beam splitter) 3 are arranged on a light path of the light emitted from a light source 1 such as halogen light source or mercury light source or others, and a Nipkow rotation disk (called rotation disk, hereinafter) 4, a first imaging lens 5, ¼ wavelength plate 6 and a sample 8 through an objective 7 are arranged on the reflected light path of the PBS 3. In addition, a CCD camera 10 is arranged through a second imaging lens 9 on the filtered light path of the PBS 3 of the light reflected from the sample 8. A monitor 11 is connected to the image output terminal of this CCD camera 10 for displaying the image taken by the CCD camera.

Here, pin holes 4*a* are arranged in spiral on the rotation disk 4 with an interval of about ten times of the pin hole diameter between respective pin holes, and the rotation disk 4*a* is connected to the shaft of a not shown motor via a rotation shaft 12 and rotated at a fixed rotation speed.

In such configuration, the light emitted from the light source 1 passes through the condenser lens 2 and only polarized component of a fixed direction is reflected by the PBS 3 and input to the rotation disk 4 rotating at the fixed speed, and the light filtered by the pin hole 4*a* of this rotation disk 4 passes through the first imaging lens 5, circularly polarized by the ¼ wavelength plate 6, imaged by the objective lens 7 and input to the sample 8. On the other hand, the light reflected from the sample 8 passes through the objective lens 7, takes a polarization direction orthogonal to the incident light again at the ¼ wavelength plate 6, and projects the sample image on the rotation disk 4 by means of the first imaging lens 5. A focused portion of the sample image projected on the rotation disk 4 passes through the pin hole 4*a*, further passes through the PBS 3 and taken by the CCD camera 10 through the second imaging lens 9. A confocal image taken by the CCD camera 10 is displayed on the monitor 11.

Such confocal microscope allows to observe a so-called sectioning image, namely image for each level of the sample 8, by moving the focus vertically (Z axis direction), as only images having focused position (height) where the pin hole 4*a* of the rotation disk 4 passes can be observed.

By the way, for the confocal microscope using such Nipkow rotation disk, it is necessary to dispose pin holes on the rotation disk so that unevenness may not come into prominence in the observation field during the eye observation or imaging by a CCD camera. In short, it is necessary to arrange pin holes so that the sample observation field is illuminated evenly within a human perceptible time interval (about 1/20 to 1/30 sec) or CCD camera exposure time (often 1/60 or 1/30 sec).

Therefore, conventionally, various proposals have been made concerning the pin hole arrangement and, for instance, an arrangement wherein a plurality of pin holes are arranged in spiral in the rotation disk radial direction with an equal angle is known as the simplest arrangement. However, in such pin hole arrangement, the brightness of captured image is uneven, because the pin hole pitch is different in the outer circumferential section and the inner circumferential section of the rotation disk.

As a method to solve such problem, various pin hole arrangements for reducing the uneven brightness of captured image, such as an arrangement wherein the radial pitch of the locus of the virtual center line connecting centers of a plurality of pin holes composing pin hole lines arranged in spiral and the circumferential pitch along the spiral are made equal, or an arrangement wherein all pin holes composing a plurality of pin hole lines are differentiated in diameter at their center position have been proposed.

However, in the former pin hole arrangement, certainly, the image brightness in the observation field is even when the rotation disk center and the rotation axis agree exactly, but the observed image brightness is uneven when the rotation disk center and the rotation axis disagree. In general, the pin hole diameter is so small as about several dozens of $\mu$m (45 $\mu$m for 100 times, 100 $\mu$m for 250 times); therefore, it is necessary to limit the difference between the rotation disk center and the rotation center to 10 $\mu$m or less, namely sufficiently smaller than the pin hole diameter so that the observed image brightness may not be uneven, thereby, requiring an extremely high precision for perforation of pin hole on the rotation disk, shaping of the rotation disk, attachment of the rotation disk to the rotation shaft, or other processing.

On the other hand, the latter pin hole arrangement is improved to reduce the unevenness of observed image brightness; however, the unevenness is certainly reduced, but not eliminated.

In addition, when pin holes are formed on the rotation disk in this way, the pin hole arrangement is so devised not to make the observed image brightness uneven for all samples, and the pin hole is positioned using a complicated pattern prepared extremely precisely, in order to position each pin hole exactly. For instance, for Nipkow rotation disk, Cr or low-reflective Cr film is formed on a glass substrate, masked with a pin hole pattern and etched, and this mask is prepared by a EB drawing machine using electron beam similarly as semiconductor manufacturing, making the rotation disk preparation very costly and expensive due to the use of such complicated pattern mask.

Therefore, in order to solve these problems, it has been proposed a rotation disk wherein a straight line pattern section 141 including linearly formed translucent sections and shield sections arranged alternately, a full translucent section 142, and shield sections 143, 144 in each fan-shaped areas between these straight line pattern section 141 and full translucent section 142 are disposed on a rotation disk 14 as shown in FIG. 3A, and the width of translucent sections and shield sections of the straight line pattern section 141 among them is set to about several dozens of μm similarly as the pin hole diameter, and formed to 1:1 as shown in FIG. 3A and FIG. 3B.

According to such rotation disk, first, an observation when the observation field passes through the straight line pattern section 141 is taken by the CCD camera, then an observation when it passes through the full translucent section 142 is taken by the CCD camera. In this case, a combined image (confocal image including non-confocal component) including not only an image having focused position (height) components (confocal component), but also image having non-focused position (height) components (permeated non-confocal component) is obtained, because the ratio of each width of translucent sections 141*a* and shield sections 141*b* is equal, for the image taken in the straight line pattern section 141. Consequently, only the confocal image having position (height) components in good focus ban be obtained by the difference calculation of bright-field taken through the full translucent section 142 from this combined image. In addition, uneven brightness is not generated in the observation image even when the rotation disk rotation center has shifted, and the rotation disk preparation cost will be limited because the pattern for creating the straight line pattern section 141 including linearly formed translucent sections and shield sections arranged alternately is a simple linearly pattern.

On the contrary, in the rotation disk 141 shown in FIG. 3A and FIG. 3B, the non-confocal component is prominent, because the ratio of each width of translucent sections and shield sections of the straight line pattern section 141 is 1:1. Therefore, a so-called sectioning effect, containing only confocal image can be expected only by the difference calculation. This generates problems such as impossibility of directly viewing the confocal image, necessity of operation equipment such as computer for image processing, enlargement of equipment scale, cost increase, and moreover, two images subjected to the difference calculation are susceptible to disturbance such as vibration, because they are taken with different timing.

BRIEF SUMMARY OF THE INVENTION

An object of the present invention is to provide a pattern formation member applied to a sectioning image observation apparatus for stably observing a good image, without-making the observed image brightness uneven and a sectioning image observation apparatus.

A pattern formation member adopted to a sectioning image observation apparatus which selectively irradiates a light from a light source to a sample, scans the sample, and acquires a light from the sample as a sectioning image, is characterized in that the pattern formation member comprises an irradiation section and a cutoff section, each of the irradiation section and the cutoff section is in a straight pattern, and these straight patterns are disposed alternatively.

Another pattern formation member adopted to a sectioning image observation apparatus which has a rotation disk having a translucent section which passes a light and a shield section which shields a light and rotating on a light path, irradiates a light passing through the translucent section to a sample, scans the sample, and passes a light from the sample passed through the rotation disk to acquire a sectioning image, is characterized in that each of patterns to scan the sample by the light passing through the rotation disk is formed in a straight pattern, and these patterns are disposed alternatively, straight pattern areas of the translucent section and the shield section with different direction are formed not to be parallel to a scanning direction (H direction) according to a rotation of the rotation disk in an observation field.

Preferable manners of the present invention are as follows.

(1) The pattern formation member is a rotation disk such that the irradiation section is a translucent section to pass a light and the cutoff section is a shield section to shield a light, the rotation disk is rotated on a light path, each of patterns to scan the sample by the light passing through the rotation disk is formed in a straight pattern, and these patterns are disposed alternatively.

(2) A shield area is formed at a portion to which straight patterns of the translucent section and the shield section of the rotation disk is parallel to a scanning direction (H direction) according to a rotation of the rotation disk in an observation field.

(3) The straight pattern areas have a plurality of sector shaped areas divided in a circumferential direction of the rotation disk.

(4) A portion parallel to a scanning direction (H direction) according to a rotation of the rotation disk in an observation field has another straight pattern area of the translucent section and the shield section with sector shape having a predetermined central angel whose direction differs from the straight pattern.

(5) A width of the straight pattern of the shield section is larger than that of the translucent section.

(6) The pattern formation member is a digital micro mirror having a plurality of mirrors, whose directions are independently changeable, disposed in a two-dimensional form.

(7) A plurality of areas having different ratios of the translucent section and-the shield section are further provided.

(8) A plurality of areas having different direction of the translucent section and the shield section of the straight pattern of the rotation disk are further provided.

(9) The rotation disk is a rotation disk in which a rotation radial direction of the rotation disk is not normal to a direction of the straight pattern of the translucent section and shield section.

(10) A width of a straight-portion of the rotation disk which shield a light is larger than a width of a straight portion thereof which passes a light.

(11) A width of a straight portion of the rotation disk is substantially constant.

(12) The rotation disk is divided into a plurality of areas and a pattern of each of the plurality of areas is different.

(13) A pattern of each of the plurality of areas has an equal area ratio of the translucent section and the shield section, and widths of the translucent section and the shield section are different for each of the areas.

(14) When a width of different direction area having a-constant width is X and a period of the translucent section and the shield section is W in the rotation disk, X/W is constant.

(15) The patterns of the plurality of concentric circle areas have an equal area ratio of the translucent section and the shield section, a width of inner circumference concentric circle area is smaller than that of outer circumference concentric circle area, and a width of different direction area of the inner circumference concentric circle area is smaller than that of outer circumference concentric circle area.

(16) When the translucent sections of the least two concentric circle areas have a same width and a period W of the translucent section and the shield section is different, a period of the translucent section and the shield section on an inner concentric circle area is smaller than that of an outer concentric circle area, and a width X of a different direction area of inner and outer concentric circle areas is proportional to the period W.

A sectioning image observation apparatus according to the present invention scans a sample with a light by using any one of above-mentioned pattern formation members, and acquires a reflected light from the sample as a sectioning image through the pattern formation member. With this arrangement, it is preferable that a moving mechanism to change a projection position on the rotation disk to the sample is further provided.

Another sectioning image observation apparatus according to the present invention enters an excited light with a predetermined wavelength through an excitation filter to any one of above-mentioned pattern formation members, scans a sample with a light by using the pattern formation member, and acquires a fluorescence emitted from the sample as a sectioning image through the pattern formation member and a barrier filter selecting a wavelength of the emitted fluorescence.

A still another sectioning image observation apparatus is characterized by comprising: a light source; a rotation disk having a pattern in which a slit translucent section which passes a light and a straight shading section which shields a light, are alternately and periodically arranged; means to lead a light from the light source to the rotation disk; means to irradiate a light passing the rotation disk to a sample and project a pattern of the rotation disk to the sample; an optical lens which projects a light reflected from the sample on the rotation disk; and means to rotate the rotation disk on an optical path, scan the pattern of the rotation disk projected on the sample, and acquires an image passing the rotation disk as an sectioning image among sample images projected on the rotation disk, and when an angle of the rotation disk surface and a surface normal to an optical axis is θ, an aperture of the lens from the sample is NA, an expansion rate of a sample image projected on the rotation disk is M, a diameter (called as a number of view) on the rotation disk in an area of the observed sample is R, an angle between a main light beam which passes at an outermost edge of a diameter on the rotation disk of the observed sample area and an optical axis is ϕ, and a wavelength of the light is λ, at least one of the following conditions are satisfied:

$$\theta > \phi + 2NA/M, \text{ and}$$

$$\theta < \frac{M^2\lambda}{NA^2R}.$$

As the result, according to the present invention, a high quality observation image without uneven brightness can be obtained even when the rotation disk rotation center has shifted, because the straight pattern of translucent sections and shield sections are scanned while changing the direction thereof according to the rotation of the rotation disk 141.

Also, uneven brightness is prevented from occurring in the observed image, because it is so devised that the scanning direction (H direction) by the rotation of the rotation disk in the observation field and the direction of the straight pattern of translucent sections and shield sections will not be parallel.

Moreover, the mask pattern preparation is simple and cheap in cost, because the straight patterns of translucent sections and shield sections are only arranged alternately.

In addition, according to the present invention, the permeability of the rotation disk can be set by providing a plurality of areas where a pattern constituted of alternately disposed straight translucent sections and shield sections, changing the line width for each area, and allowing to move the rotation disk use area, the sectioning effect and the image brightness can be set selectively according to the sample situation, light can be used effectively according to the sample, and it becomes possible to obtain a bright sectioning image for various kinds of samples.

Further, according to the present invention, a pattern corresponding to the objective magnification or number of apertures, among a plurality of patterns on the disk, without making the observed image brightness uneven, so a disk applied to a sectioning image observation apparatus for stably observing a good image, and a sectioning image observation apparatus can be supplied.

Besides, according to the present invention, a confocal image can be observed even with a plurality of objectives, and images of different confocal effect can be observed, by dividing a disk where translucent sections and shield sections are arranged linearly into a plurality of concentric areas, and changing the translucent section slit width (L) and the shield section width (W-L) in each area, and at the same time, every confocal image observed in any area can be made homogenous and satisfactory, because the width X of a different direction area where patterns for suppressing the generation of alternating contrast stripes can be decided by the cycle W of translucent sections and shield sections. Further, as the width of different direction area can be decided easily, it is unnecessary to remake times and times for deciding the width of this area, reducing the examination time and the cost.

Moreover, according to the present invention, the rotation disk inclination angle can be decided practically for reducing unnecessary reflected light (flare) by calculation considering the magnification of the sample image projected on the disk, field of view range, and light incident angle; therefore, not only the angle can be decided to obtain a good contrast sectioning image free of flare, but also it is possible to include the disk inclination within the focal depth of the sample, preventing an image focused to different height on the sample from being observed.

Still further, according to the present invention, in place of scanning the pattern where straight translucent sections and shield sections are arranged alternately using a disk, the pattern is created and scanned by using a micro mirror array and changing the direction of respective micro mirror. Consequently, the slit light width can be created in correspondence to various objectives, making useless to exchange disks, or make a disk divided into a plurality of areas circumferentially, and a quality confocal image can be obtained simply, as a pattern corresponding to an objective can be created, without modification.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 shows a schematic configuration of a first embodiment of the present invention;

FIG. 5A and FIG. 5B show a schematic configuration of a rotation disk used for the first embodiment of the present invention;

FIG. 9 shows a schematic configuration of a rotation disk used for a fourth embodiment of the present invention;

FIG. 10 shows a schematic configuration of a rotation disk used for a fifth embodiment of the present invention;

FIG. 11 is a figure to explain the fifth embodiment;

FIG. 15A and FIG. 15B show a rotation disk in an eighth embodiment of the present invention;

FIG. 21 shows the relationship between the contrast ratio and the different direction area width X;

FIG. 22 shows the relationship between the contrast ratio and the different direction area width X;

FIG. 24 shows the calculation results of the relationship between the contrast ratio and the different direction area width X;

FIG. 25 shows the calculation results of the relationship between the contrast ratio and the different direction area width X;

FIG. 26 shows a rotation disk in a fourteenth embodiment of the present invention;

FIG. 32A to FIG. 32D show pattern examples created by the micro mirror array;

DETAILED DESCRIPTION OF THE INVENTION

Now, embodiments of the present invention will be described referring to attached drawings.

(First Embodiment)

Figure 1:
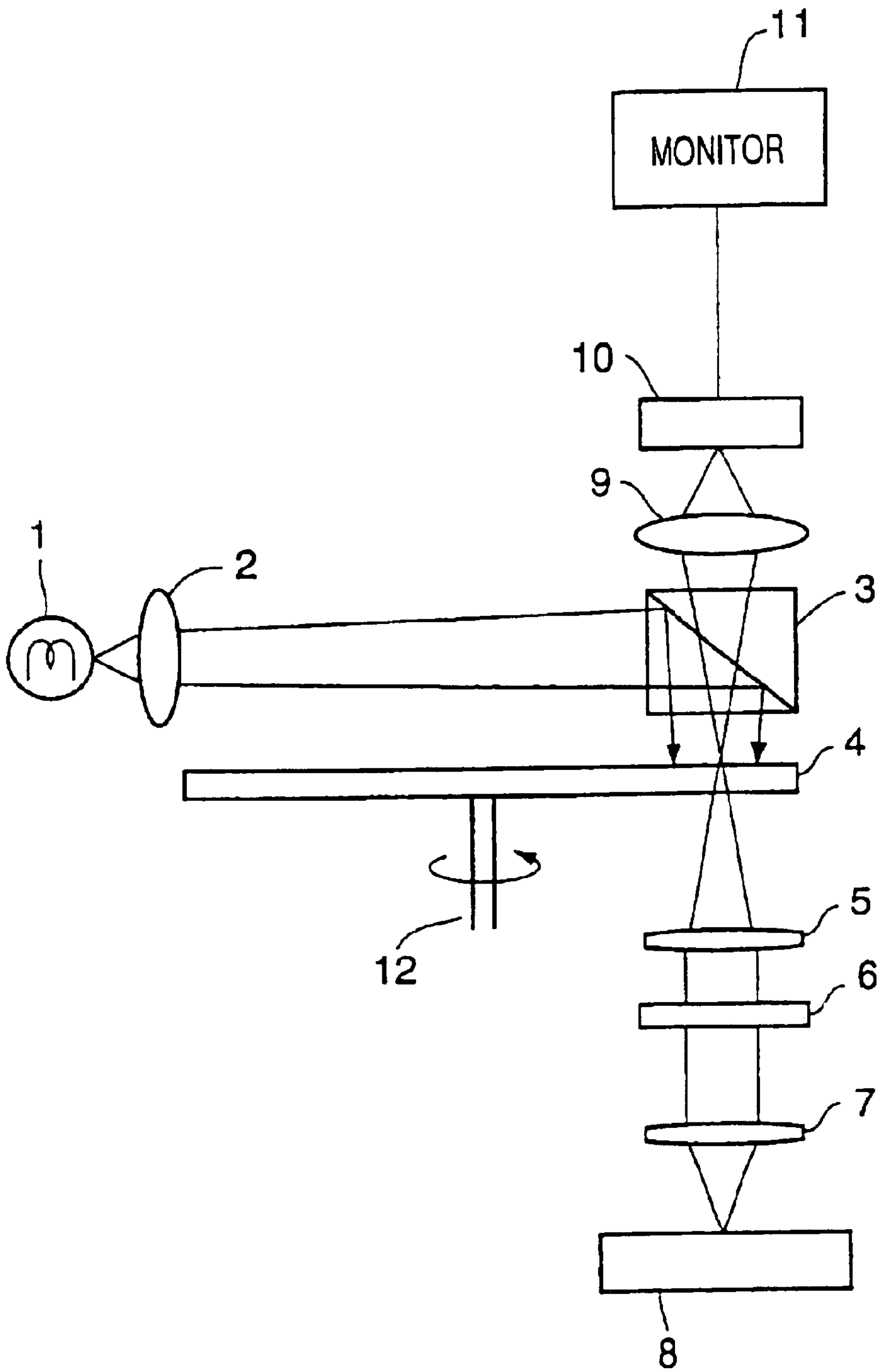
FIG. 1 shows a schematic configuration of an example of a conventional confocal microscope.
Figure 2:
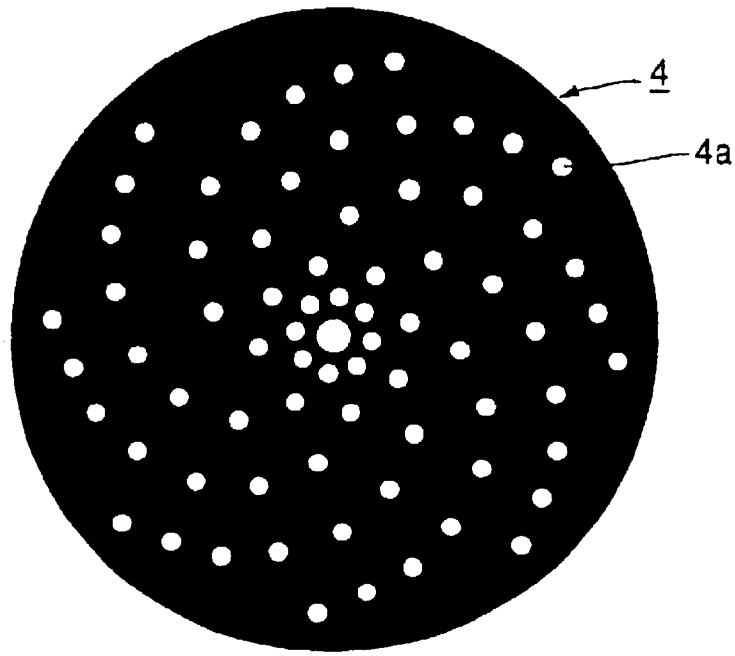
FIG. 2 shows a schematic configuration of a rotation disk used for the conventional confocal microscope.

FIG. 4 shows a schematic configuration of a confocal microscope having a confocal effect as sectioning image observation apparatus (called confocal microscope, hereinafter) to which the present invention is applied, and same symbols are affected to the parts identical to FIG. 1.

In this case, a condenser lens 2, a deflecting plate 15, and a PBS (polarized beam splitter) 3 are arranged on a light path of the light emitted from a light source 1 such as halogen light source, mercury light source or the like, and a rotation disk 13 which is a pattern formation member, a first imaging lens 5, ¼ wavelength plate 6 and a sample 8 through an objective 7 are arranged on the reflected light path of the PBS 3. In addition, a CCD camera 10 is arranged through a second imaging lens 9 on the filtered light path of the PBS 3 of the light reflected from the sample 8. A monitor 11 is connected to the image output terminal of this CCD camera 10 for displaying the image taken by the CCD camera 10.

Here, the rotation disk 13 is connected to the motor (not shown) to be able to transmit, that is, the shaft of the motor via a rotation shaft 12 etc. and rotated at a fixed rotation speed. As shown in FIG. 5A, respective patterns of linearly formed translucent sections 13*a* and linearly formed shield sections 13*b* are arranged alternately on the rotation disk 13.

In this case, as shown in FIG. 5A and FIG. 5B, the width of the straight shield section 13*b* is larger than the straight translucent section 13*a* and is set to 1:9 for example. Besides, suppose the projection magnification of the sample image on the rotation disk 13 be M, light wavelength λ and the aperture of the objective NA, the width L of the straight translucent section 13*a* is decided by the following expression:

$$L=k\lambda M/NA \tag{1}$$

Here, k represents a coefficient, and k=0.5 to 1 or so is often used.

For instance, as the objective 7, if the magnification 100 times, NA=0.9 are used, λ is visible and 550 nm is often used, and the width L becomes approximately 45 μm, but set within the range of 30 to 60 μm considering k=0.5 to 1.

Next, the function of thus constituted first embodiment will be described.

Light emitted from the light source passes the condenser lens 2, becomes a straight line polarized light containing only a certain polarized light at the deflecting plate 15, and enters the PBS 3. The PBS 3 reflects the polarized light in the direction passing through the deflecting plate 15, and permeates the polarized light in a direction perpendicular thereto. Light reflected by the PBS 3 enters the rotation disk 13 rotating at a fixed speed.

Then the light having passed through the straight translucent section 13*a* of this rotation disk 13, passes through the first imaging lens 5, becomes a circular polarized light at the ¼ wavelength plate 6, is imaged by the objective 7 and enters the sample 8. On the other hand, light reflected from the sample 8 passes through the objective 7, becomes a straight polarized light orthogonal to the incidence at the ¼ wavelength plate 6, and forms a sample image on the rotation disk 13 through the first imaging lens 5.

Figure 6A:
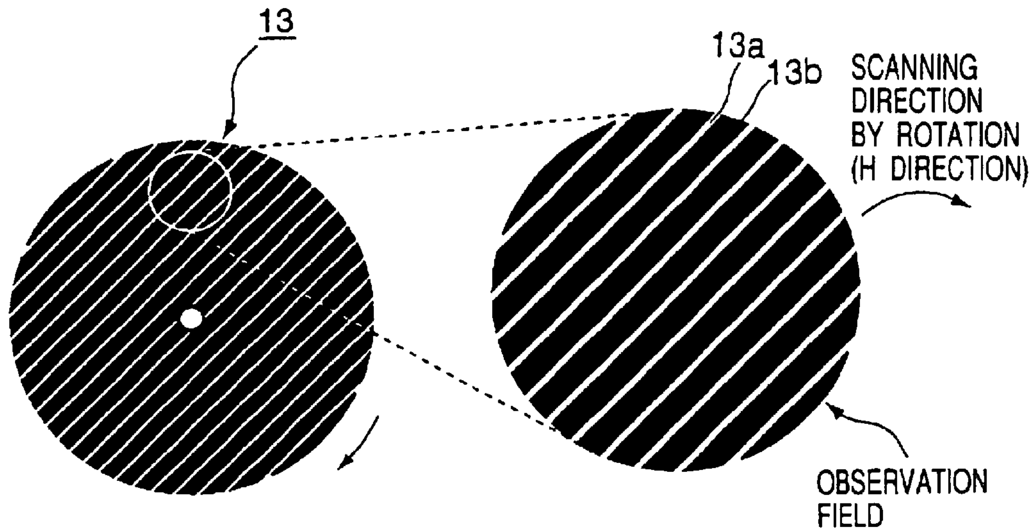
FIG. 6A and FIG. 6B illustrate the first embodiment.

Considering a moment during the observation of the sample 8, as show in FIG. 6A, line projection is performed in a certain direction. Then, in this sate, if the light reflected from the sample 8 forms an image on the rotation disk 13, a focused portion of the sample 8 can pass through the rotation disk 13 because it is projected in line by multiplying the line projected on the rotation disk 13 with the sample image, most of non-confocal image cannot pass through the rotation disk 13, because its image projected on the rotation disk 13 is also not focused. As it is, the sample image and the pattern image are simply superposed; however, according to the rotation of the rotation disk 13, the pattern image is shifted (scanned) on the sample image changing the direction, they are averaged to erase the line image and a focused quality image can be observed.

Accordingly, if the rotation disk 13 rotates fast enough in respect to the exposure time of the CCD camera 10, a confocal image take by the CCD camera 10 can be observed by the monitor 11. To be more specific, in this case, if the CCD camera 10 is an ordinary TV rate, the exposure time is 1/60 or 1/30 sec; therefore, it may be set to 1800 rpm with which the rotation disk 13 makes a half revolution during these exposure times.

Therefore, in this way, a sectioning image which is a confocal image can be obtained by a simple pattern configuration of arranging alternately patterns of straight translucent sections 13*a* and shield sections 13*b*. In addition, a high quality observation image without uneven brightness can be obtained even when the rotation disk rotation center has shifted, because straight line patterns of straight translucent sections and shield sections are arranged, the straight lines are always scanned in different directions according to the rotation of the rotation disk, different from the case of the aforementioned pin holes.

Besides, the mask pattern can be created by the EB drawing machine at an extremely low cost, because only straight patterns are arranged, different from a complicated arrangement of a number of pin holes as in the case of Nipkow rotation disk.

(Second Embodiment)

Now, the second embodiment of the present invention will be described.

In this case, as the confocal microscope to which the second embodiment is applied is similar to that in FIG. 4, FIG. 4 will be used.

Figure 6B:
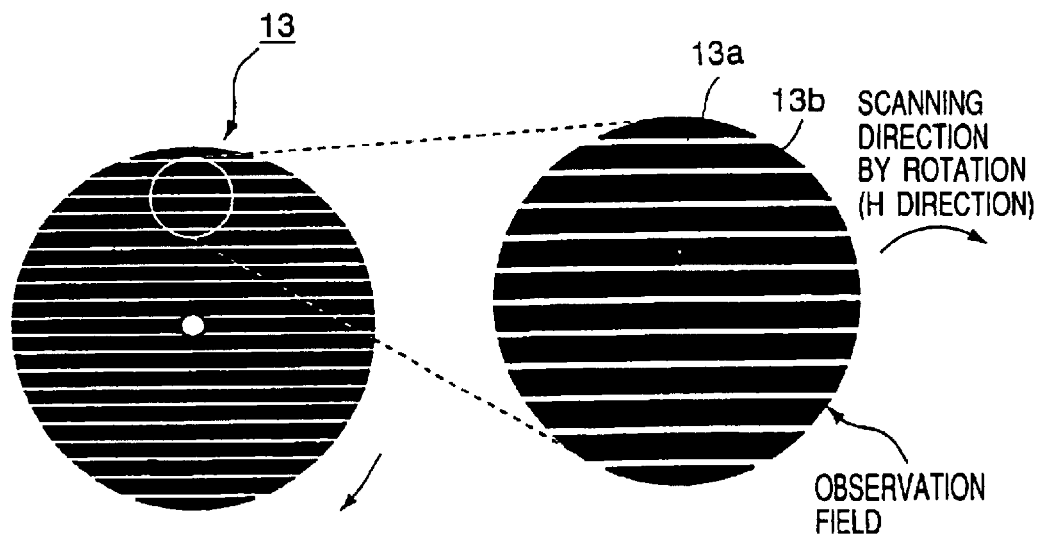

By the way, considering the pattern movement in the observation field during the rotation of the aforementioned rotation disk 13, as translucent sections 13*a* and shield sections 13*b* are formed with straight patterns, the scanning direction (H direction) by the rotation of the rotation disk in the observation field and the straight line patterns of translucent sections 13*a* and shield sections 13*b* may become parallel as shown in FIG. 6B, before and after this, the observation image may have an uneven brightness in the rotation direction of the rotation disk, because, in this state, the pattern projected on the sample varies hardly, even when the rotation disk 13 continues to rotate.

Figure 7:
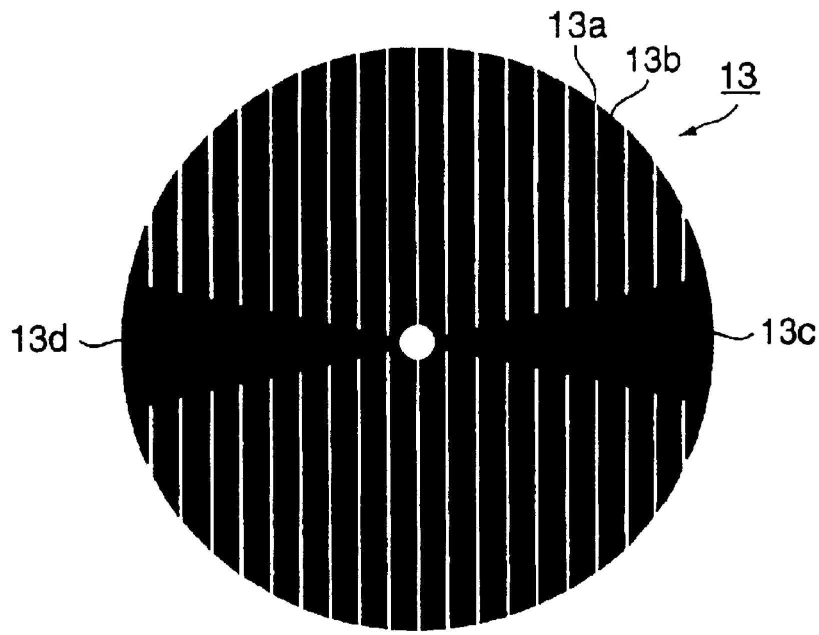
FIG. 7 shows a schematic configuration of a rotation disk used for a second embodiment of the present invention.

FIG. 7 shows a rotation disk considering the uneven brightness that had possibilities to appear in the observation image described using FIG. 6B, and now, a confocal microscope using the rotation disk shown in FIG. 7 will be described referring to FIG. 4.

In this case, for the rotation disk 13, respective straight patterns of linearly formed translucent sections 13*a* and straight shield sections 13*b* are arranged alternately all over the rotation disk surface, and among these straight patterns of translucent sections 13*a* and shield sections 13*b*, fan-shaped shield areas 13*c*, 13*d* are formed with several degrees of center angle, along a direction orthogonal to the straight pattern of these translucent sections 13*a* and shield sections 13*b*, in the portion parallel to the scanning direction (H direction) by the rotation direction of the rotation disk in the observation field.

Therefore, the shield areas 13*c*, 13*d* are formed in the portion where the scanning direction (H direction) by the rotation of the rotation disk in the observation field and the straight line patterns of translucent sections 13*a* and shield sections 13*b* may become parallel, in a way to inhibit to observe the image in this portion, thereby preventing an uneven brightness from appearing in the observed image.

Moreover, in the shield areas 13*c*, 13*d* on the rotation disk 13, the light from the light source 1 to the sample 8 is shielded, the brightness may vary among images taken successively, if the rotation of the rotation disk 13 is slow in respect to the exposure time of the CCD camera 10, and this problem can be resolved by synchronizing the rotation of the rotation disk 13 and the shooting by this CCD camera 10 so that, for instance, the rotation disk 13 makes a half revolution during the exposure time of the CCD camera 10.

(Third Embodiment)

Now, the third embodiment of the present invention will be described.

In this case, as the confocal microscope to which the third embodiment is applied is similar to that in FIG. 4, FIG. 4 will be used.

Figure 8:
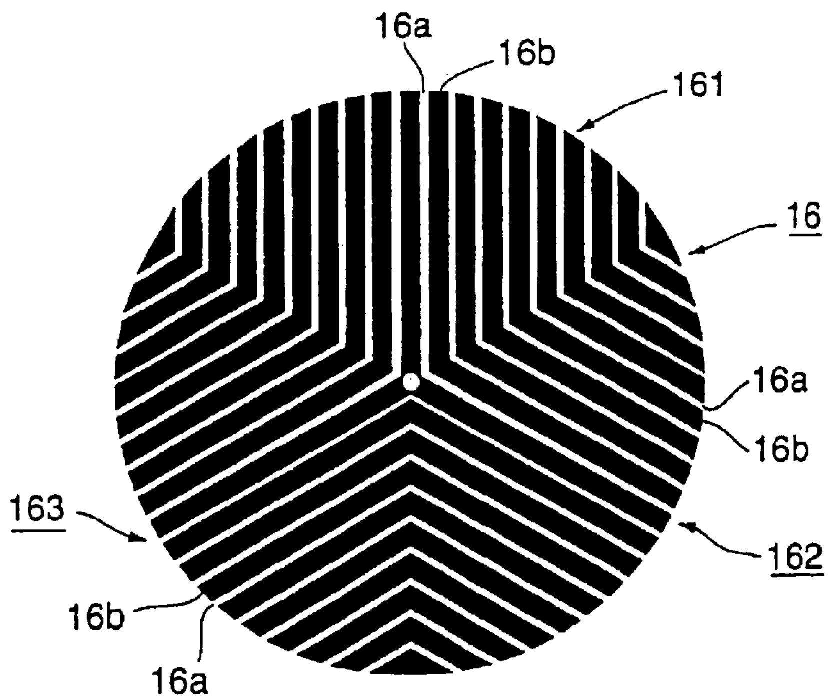
FIG. 8 shows a schematic configuration of a rotation disk used for a third embodiment of the present invention.

FIG. 8 shows a schematic configuration of a rotation disk used for such confocal microscope, and fan-shape areas 161, 162, 163 divided into three in the circumferential direction are formed on the rotation disk 16, as shown in FIG. 8, and patterns of straight translucent sections 16*a* and straight shield sections 16*b* are arranged alternately in respective areas 161, 162, 163. In this case, straight translucent sections 16*a* and shield sections 16*b* in respective areas 161, 162, 163 change the straight direction in the observation field, according to the rotation of the rotation disk 16, and at this time, it is set so that the scanning direction (H direction) by the rotation of the rotation disk in the observation field and the straight line patterns of translucent sections 16*a* and shield sections 16*b* never become parallel in any case.

In addition, in this case, the width of the straight shield section 16*b* is larger than the straight translucent section 16*a* and is set to 1:9 for example. Besides, the width L of the straight translucent section 16*a* is decided by the expression (1) mentioned above.

According to such rotation disk 16, considering a moment during the observation of the sample 8, similarly as described for FIG. 6A, the pattern of the translucent sections 16 is line projected slant in a certain direction. Then, in this sate, the light reflected from the sample 8 forms an image on the rotation disk 16, a focused portion of the sample 8 is projected in line on the rotation disk 16, however, most of non-confocal image cannot pass through the rotation disk 16, because its image projected on the rotation disk 16 is also not focused, and only confocal image passes through the rotation disk 16. As it is, the sample image and the pattern image are simply superposed; however, according to the rotation of the rotation disk 16, the pattern image moves on the sample image changing the direction.

In this case also, when the scanning direction (H direction) by the rotation of the rotation disk in the observation field and the straight line patterns of translucent sections 16*a* and shield sections 16*b* become parallel as shown in FIG. 6B as mentioned above, the observation image may have an uneven brightness, because, in this state, the pattern projected on the sample 8 varies hardly, even when the rotation disk 16 continues to rotate; however, according to the rotation disk 16 of this embodiment, as it is set so that the scanning direction (H direction) by the rotation of the rotation disk in the observation field and the straight line patterns of translucent sections 16*a* and shield sections 16*b* never become parallel in any case, an uneven brightness does not appear in the observed image, and moreover, the line-shape images are averaged by the rotation of the rotation disk 16, allowing to observe a focused quality image.

Consequently, in this way, the portion to be parallel to the scanning direction (H direction) by the rotation of the rotation disk in the observation field is eliminated by forming a plurality of areas 161, 162, 163 different in direction with straight line patterns arranging translucent sections 16*a* and shield sections 16*b* alternately, an uneven brightness does not appear in the observed image, allowing to observe a focused quality image. In addition, as there is no portion shielding a quantity of light on the surface of the rotation disk 16, light can be used effectively, and further, a quality image can be obtained with less uneven brightness from the vicinity of the center of the rotation disk 16 to far way, by making the area width constant. Besides, the mask pattern can be created by the EB drawing machine, by scanning with electron beam in one direction, at an extremely low cost, because only straight patterns are arranged, different from a complicated arrangement of a number of pin holes as in the case of Nipkow rotation disk.

(Fourth Embodiment)

Now, the fourth embodiment of the present invention will be described.

In this case, as the confocal microscope to which the fourth embodiment is applied is similar to that in FIG. 4, FIG. 4 will be used.

FIG. 9 shows a schematic configuration of a rotation disk 17 used for such confocal microscope, and patterns of straight translucent sections 16*a* and straight shield sections 16*b* are arranged alternately on the rotation disk 17 similarly as mentioned for FIG. 5A and FIG. 5B. In addition, the relationship of width of these translucent sections 17*a* and shield sections 17*b* and the setting conditions of the width L of the translucent section 17*a* are also as mentioned for FIG. 5A and FIG. 5B.

Among the straight patterns of these straight translucent sections 17*a* and straight shield sections 17*b*, areas 19*a*, 19*b* having a plurality of translucent sections 18*a* and shield sections 18*b* in a direction orthogonal to the straight pattern of these translucent sections 17*a* and shield sections 17*b*, are disposed in the portion parallel to the scanning direction (H direction) by the rotation direction of the rotation disk in the observation field. In this case, the areas 19*a*, 19*b* are formed in fan-shape by changing sequentially the length of respective straight patterns from the rotation disk periphery, and the center angle θ is decided by the reduction degree of uneven brightness, width of the translucent sections 18*a* and shield sections 18*b*, and distance R between the observation field and the rotation disk 17 rotation center. For instance, when the width of the translucent sections 18*a* is 20 μm, width of shield sections 18*b* 180 μm, and distance R 30 mm, in order to reduce the uneven brightness to 1% or less, θ is set to about 10 degrees.

Therefore, the use of such rotation disk 17 also allows to obtain a sectioning image without uneven brightness, and moreover, patterns can be formed easily on the rotation disk 17, thereby reducing the cost, because respective straight patters exist substantially only in two directions as for the straight line direction, even though divided in four areas.

(Fifth Embodiment)

Now, the fifth embodiment of the present invention will be described.

In this case, as the confocal microscope to which the fifth embodiment is applied is similar to that in FIG. 4, FIG. 4 will be used.

FIG. 10 shows a schematic configuration of a rotation disk 20 used for such confocal microscope, and patterns of straight translucent sections 20*a* and straight shield sections 20*b* are arranged alternately on the rotation disk 20 similarly as mentioned for FIG. 5A and FIG. 5B. In addition, the relationship of width of these translucent sections 20*a* and shield sections 20*b* and the setting conditions of the width L of the translucent section 20*a* are also as mentioned for FIG. 5A and FIG. 5B.

Among the straight patterns of these straight translucent sections 20*a* and straight shield sections 20*b*, an area 22 of a fixed width X having a plurality of translucent sections 21*a* and shield sections 21*b* in a direction orthogonal to the straight pattern of these translucent sections 20*a* and shield sections 20*b*, is disposed in the portion parallel to the scanning direction (H direction) by the rotation direction of the rotation disk in the observation field.

In this case, the width X of the area 22 is decided by the reduction degree of uneven brightness, and width of the translucent sections 21*a* and shield sections 21*b*. For instance, when the width of the translucent sections 21*a* is 6 μm, and width of shield sections 21*b* 54 μm, in the case of the rotation disk 17 mentioned for the fourth embodiment, the angle θ for reducing the uneven brightness to a fixed value or less in the portion near and in the portion far from the rotation disk center, is different. In short, suppose the distance from the rotation disk center be R, the calculation of the angle θ for reducing the uneven brightness to 1% or less, gives the result shown in FIG. 11.

This result shows that the distance R is larger, θ for reducing the uneven brightness to 1% or less is smaller; however, when the observation field is extremely large, as the portion near and the portion far from the rotation disk center are equally used, there will be prominent unevenness and attenuated unevenness in the observation field, if the areas 19*a*, 19*b* are decided to make θ constant.

However, in case of the rotations disk 20 of this fifth embodiment, width X becomes a almost constant value as shown in FIG. 11 given X=R sin θ, the uneven brightness can be reduced to a fixed value or less all over the field even when the observation field is extremely large, allowing to observe the sample still better.

(Sixth Embodiment)

Now, the sixth embodiment of the present invention will be described.

The following problems may be indicated, in the first to fifth embodiments.

The image brightness obtained by the aforementioned sectioning image observation apparatus is in proportion to the translucent section area in the observation field on the rotation disk surface.

The width of the straight pattern of the translucent section of the rotation disk is decides as a value determined from a constant of the optical system for obtaining the sectioning effect as shown before. It is more effective to adopt a larger width for the shield section, because the plan resolution and the sectioning effect in the height direction are damaged by the filtration of non-focused light from adjacent translucent sections; however, in practice, it is set to a certain value (for instance, in the aforementioned example, translucent section: shield section=1:9) compromising the total light amount contributing to the image formation. Thus, the line width value of translucent section and shield section is a fixed value, and the rotation disk permeability is constant.

However, as represented by certain semiconductor samples, there is a case of observing an upper and lower images at the same time for a sample having a predetermined height such as a multi-layered structure. For the observation of such sample, sometimes it is better to give the permeability in the observation field on the rotation disk priority, and increase the light amount contributing to the image, for securing the image brightness.

On the other hand, in case of observation with fluorescence, the increase of light source light amount for securing the image brightness may increase the irradiated light amount to the sample, resulting in a premature fading. Similarly, for the sample in the semiconductor filed, it can be considered that the irradiation light alters the resist film, and damages the sample in some cases.

Thus, concerning the application of high sectioning effect of aforementioned sectioning image observation apparatus to various kinds of sample, it is considered difficult to apply to more various kinds of sample observation, given the problem of lack of image brightness due to low permeability of the rotation disk especially in the fluorescent observation or the like. It is evident that this restriction influences prominently especially in eye observation.

Figure 12:
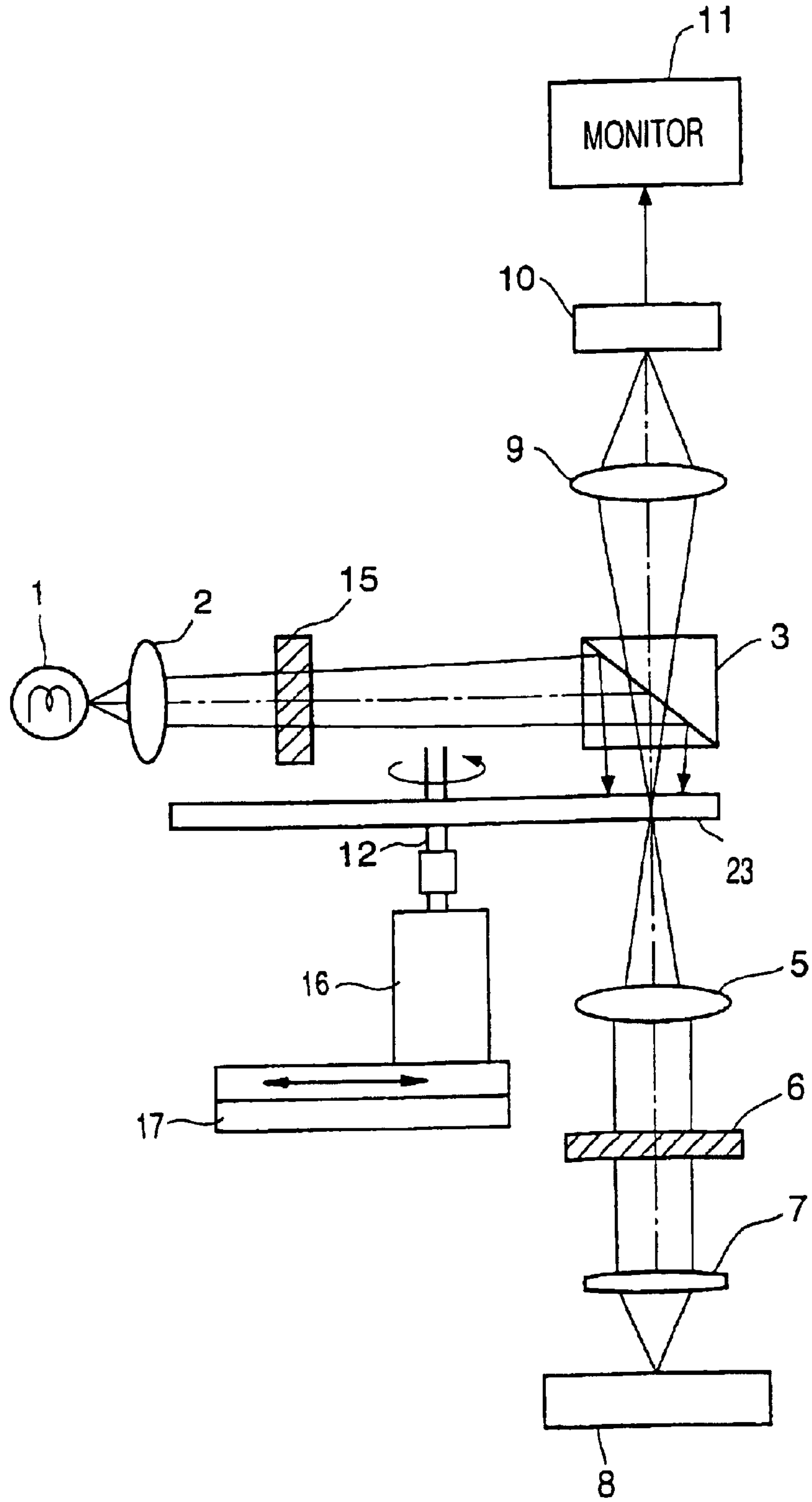
FIG. 12 shows a schematic configuration applied to the conventional confocal microscope of a sixth embodiment.

FIG. 12 shows a schematic configuration applied to the conventional confocal microscope of the sixth embodiment, and the same symbol is affected to the same part as FIG. 4. In the configuration of FIG. 12, a motor 16 and a transport stage 17 are added explicitly to the configuration of FIG. 4, both the motor 16 and the rotation disk 13 are mounted on the transport stage 17 and movable in a direction where the rotation disk 23 cross the optical axis. The other configuration being similar to that in FIG. 4, the detailed description thereof will be omitted.

Figure 13A:
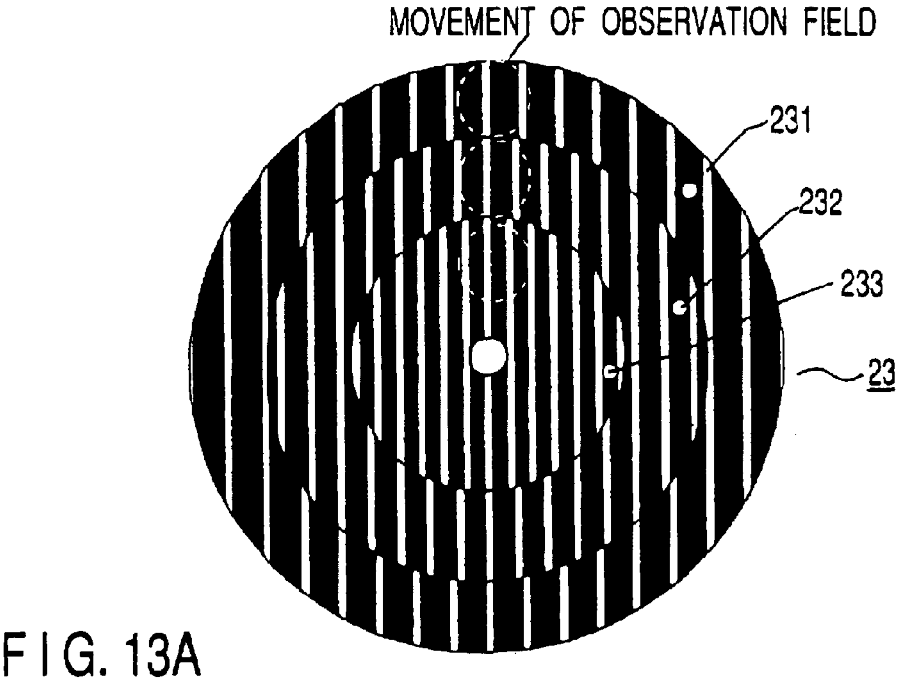
FIG. 13A and FIG. 13B show a rotation disk in the sixth embodiment of the present invention.
Figure 13B:
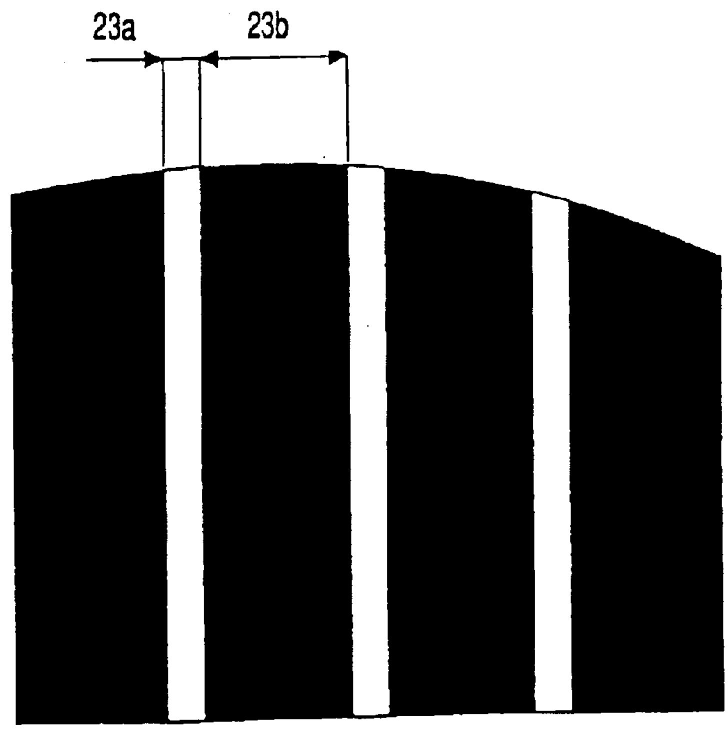

FIG. 13A and FIG. 13B show a rotation disk in the sixth embodiment of the present invention. As shown in FIG. 12A, the rotation disk 23 is divided into three concentric areas 231, 232, 233 in the rotation radial direction, and each areas has linearly formed translucent section 23$a$ and light shielding portion 23$b$ arranged alternately as shown in the enlarged view of FIG. 13B. The line widths of the shield portion 23$b$ are different respectively for three areas 231, 232, 233 mentioned above, and are for example:

231: 50×L

232: 10×L

233: 4×L in respect to the width L of the aforementioned translucent section.

Figure 3A:
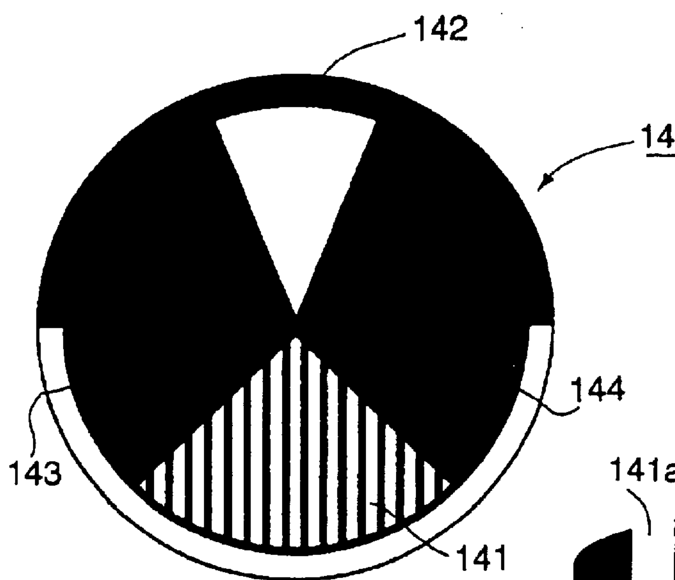
FIG. 3A and FIG. 3B show a schematic configuration of a rotation disk used for the conventional confocal microscope.
Figure 3B:
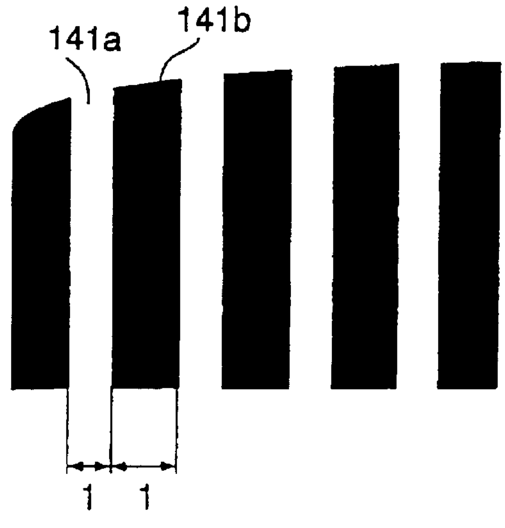

In this embodiment, 231, 232 and 232 of FIG. 3A can be selected by moving the transport stage 17 for the light incident position on the rotation disk 23, namely the position of pattern projected to the sample 8 on the rotation disk 23. This is set so that the observation field is contained within a specific area, as shown by the dot line circle in FIG. 13A.

Consequently, the rotation disk permeability in the field can be changed about 1 time, 5 times or 20 times by setting the transport stage 17. Consequently, according to the sectioning image observation apparatus of this embodiment, in case when the height direction change of the sample 8 is small, or when the irradiation amount to the sample is desired to be restricted as in the fluorescent observation, the permeability of the rotation disk 13 can be changed by selecting the use portion of the rotation disk 23 different in shield section width, through the movement of the transport stage 17.

This allows to set an appropriate sectioning effect and image brightness in accordance with the situation of the sample 8, and to perform the sectioning image observation with appropriate brightness for more various kinds of samples.

In addition, the rotation disk pattern per se is a simple line pattern similarly as the prior art, that will not increase the manufacturing cost, and can be manufactured at a low cost.

(Seventh Embodiment)

Now, the seventh embodiment of the present invention will be described.

In this case, as the confocal microscope to which the seventh embodiment is applied is similar to that in FIG. 12, FIG. 12 will be used.

Figure 14:
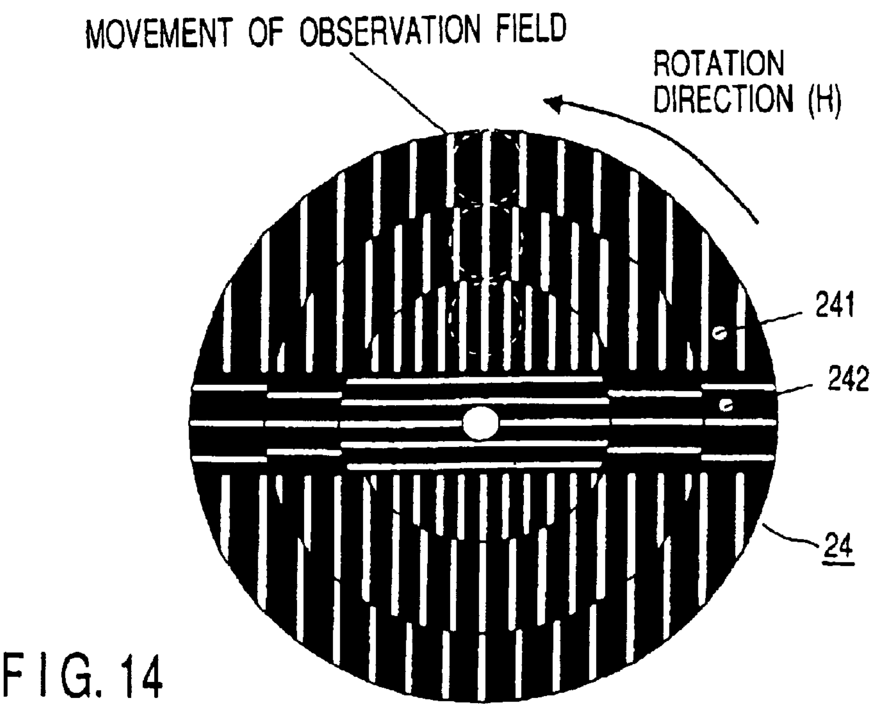
FIG. 14 shows a rotation disk in a seventh embodiment of the present invention.

FIG. 14 shows a rotation disk in a seventh embodiment of the present invention. This embodiment being pattern modification of the rotation disk of the sixth embodiment, only pattern portion will be described, and description of parts similar to the sixth embodiment will be omitted.

In the rotation disk of this embodiment, in the straight patterns 241 of the rotation disk as in FIG. 14, the straight patterns 242 are disposed orthogonal to the other portion in the portion where H direction when the rotation disk 24 rotates and the straight patterns become parallel as in FIG. 10. Three areas different in shield section width are disposed in the radial direction as in the sixth embodiment. The adoption of such rotation disk pattern limits the image uneven brightness at the position where the rotation direction (H direction) and the pattern direction become parallel, during the rotation disk rotation. The permeability of the rotation disk can be changed by modifying the use point of the rotation disk as in the sixth embodiment, and this allows to modify the image brightness in accordance with the sample situation, by still even brightness in the field.

(Eighth Embodiment)

Now, the eighth embodiment of the present invention will be described.

In this case, as the confocal microscope to which the seventh embodiment is applied is similar to that in FIG. 12, FIG. 12 will be used.

FIG. 15A shows a general view of the rotation disk 23 and FIG. 15B is a partial enlargement view of the rotation disk 25. As shown in FIG. 15A, the rotation disk 25 is divided in two areas 251 and 252 and, as shown in FIG. 15B, straight patterns such as translucent section 251$a$ and shield section 251$b$ are arranged alternately.

The translucent sections 251$a$ (or 252$a$), and shield sections 251$b$ (or 252$b$) are arranged alternately in the area 251

(or area 252), and the line width of the shield portion 251*b* (or 252*b*) is wider than the translucent sections 251*a* (or 252*a*) by 9:1.

Here, in order to dispose the area 252 disposed on the inner circumference side of the rotation disk 25, it can move in the arrow direction, by the transport stage 17 with manual or automatic control using straight guide, ball screw, rack and pinion or the like connected to the motor 16.

Concerning the width L of translucent section, as in the case of pin hole, using the expression (1), suppose the projection magnification of the sample image on the rotation disk be M, light wavelength λ and the aperture of the objective NA, and for instance in the area 251 of FIG. 15A, an objective 7 of magnification 100 times, NA=0.9 are supposed and placed on the light path, the width L of the translucent section 251*a* is set to the range of 30 to 60 μm by calculation with λ=550 nm generally used.

On the other hand, in the area 252, suppose the magnification 20 times, NA=0.4 for the objective 7, the width L of the translucent section 252*a* is set in the range of 13.75 to 27.5 μm for the same wavelength λ.

The straight line direction in the observation field changes as the rotation disk 25 rotates; however, among the straight patterns of translucent sections 251*a* (or 252*a*) and shield sections 215*b* (or 252*b*), two shield areas 281*a*, 231*b* having a center angle of several degrees are disposed in the portion where the pattern direction becomes parallel to the scanning direction in the observation field, along a direction orthogonal to the straight patterns of translucent sections 251*a* (or 252*a*) and shield sections 215*b* (or 252*b*).

Here, in the case when the sample image is desired to be observed using the area 252 of FIG. 15A, the area 252 arranged on the inner circumference side of the rotation disk 25 connected to the motor 16 can be placed on the optical path (or in the observation field) by moving in the arrow direction by the transport stage 17 as shown in FIG. 12.

Besides, two shield areas 25*a*, 25*b* are arranged as shown in FIG. 15A and 15B in the portion where the direction of straight patterns of translucent sections 251*a* (or 252*a*) and shield sections 215*b* (or 252*b*) become parallel to the scanning direction in the observation field, and in these areas, observation image is not formed, preventing uneven brightness from appearing.

Thus, a good confocal image of the sample 8 can be obtained only by moving the rotation disk 25, without changing the rotation disk, as the optimal pattern for the objective magnification and the number of aperture can be selected from a plurality of areas concentrically disposed on the rotation disk 25.

In addition, uneven brightness does not appear in the observation image, because the rotation disk pattern is as simple as arranging only translucence portions and shield portions alternately. Besides, the mask pattern can be created by the EB drawing machine, by only scanning with electron beam in one direction, at an extremely low cost, different from a precise and complicated arrangement of a number of pin holes of the rotation disk, as in the case of Nipkow rotation disk.

(Ninth Embodiment)

Now, the ninth embodiment of the present invention will be described.

Figure 16:
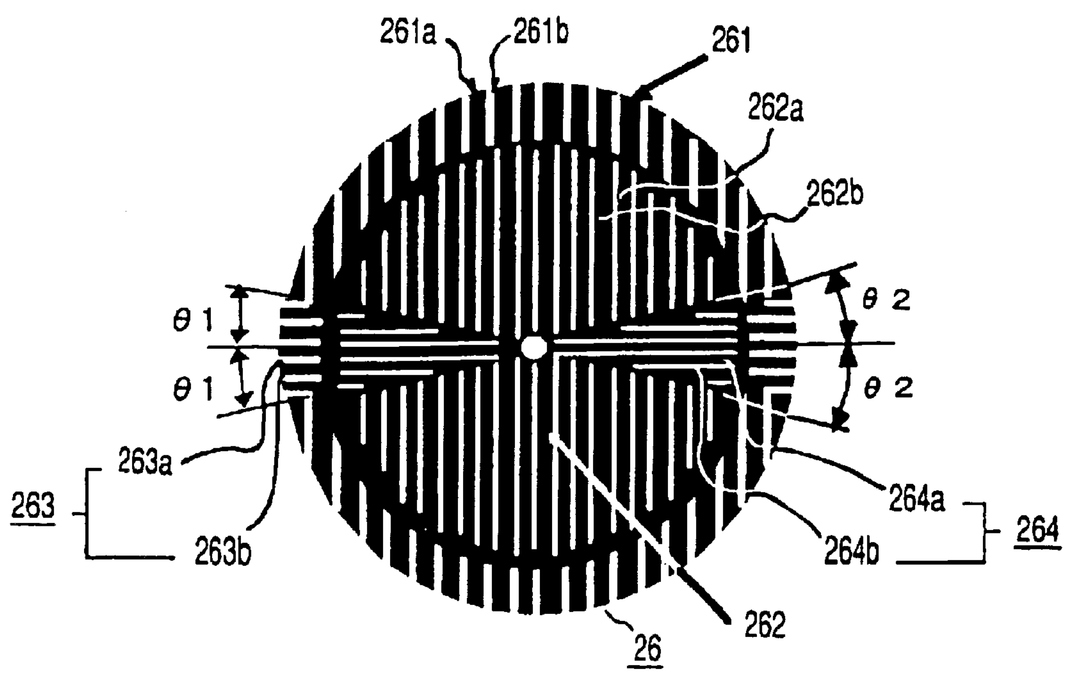
FIG. 16 shows a rotation disk in a ninth embodiment of the present invention.

FIG. 16 illustrates the configuration of the ninth embodiment of the present invention. This embodiment is a pattern modification of the rotation disk of the eighth embodiment, only pattern portions will be described, and description of parts similar to the eighth embodiment will be omitted.

In the ninth embodiment also, the width of the translucent section 261*a* (or 262*a*) is wider than the shield section 261*b* (or 262*b*) and set to 9:1 for instance. Besides the width L of the translucent section 261*a* (or 262*b*) is decided by the aforementioned expression (1).

Among straight patterns of translucent sections 261*a* and shield sections 261*b* in the rotation disk of this embodiment, there are provided two areas 263 having translucent section 263*a*, shield section 263*b* disposing straight patterns and placed orthogonal to the straight patterns of translucent sections 261*a* and shield sections 261*b* in the portion where the straight patterns become parallel to the rotation disk scanning direction when the rotation disk 24 rotates. These two area 263 are disposed symmetric to the rotation disk center. Two areas 263 described above are formed by changing the length of respective straight pattern sequentially from the rotation disk periphery, and the center angle θ is decided by the reduction degree of uneven brightness, width of the shield section 261*b* and translucent section 261*b*, and distance R between the observation field and the rotation disk 26 rotation center. For instance, in the two areas 263, when the translucent section is 20 μm, the shield section 180 μm, and distance R 30 mm, in order to reduce the uneven brightness to 1% or less, θ is about 10 degrees.

In case where a low magnification objective (and low NA objective) is used, as the width of the translucent section 262*a* reduces, for instance, in two areas arranged symmetrical to the rotation center, suppose the translucent section be 6 μm and the shield section 54 μm, the center angle θ2 can be determined from FIG. 11.

Similarly to the eighth embodiment, if the sample image is desired to be observed using the inner circumference side area 4 of the rotation disk 26, objective lens 7 different in magnification and number of aperture can be used only by moving the rotation disk 26, without changing the rotation disk 26, by moving the rotation disk 26 connected to the motor 16 in the arrow direction as shown in FIG. 12.

In addition, a sectioning image can be obtained without making uneven brightness, by forming area 264*a* and area 264*b*, for the portion in parallel with the rotation disk scanning direction, among straight patterns arranging translucent section 261*a* (or 262*b*) and shield section 261*b* (or 262*b*) alternately.

Further, patterns can be formed on the rotation disk at a low cost, because there are nothing but two straight line directions, even though this rotation disk is divided into four in the circumferential direction.

(Tenth Embodiment)

Now, the tenth embodiment of the present invention will be described.

Figure 17:
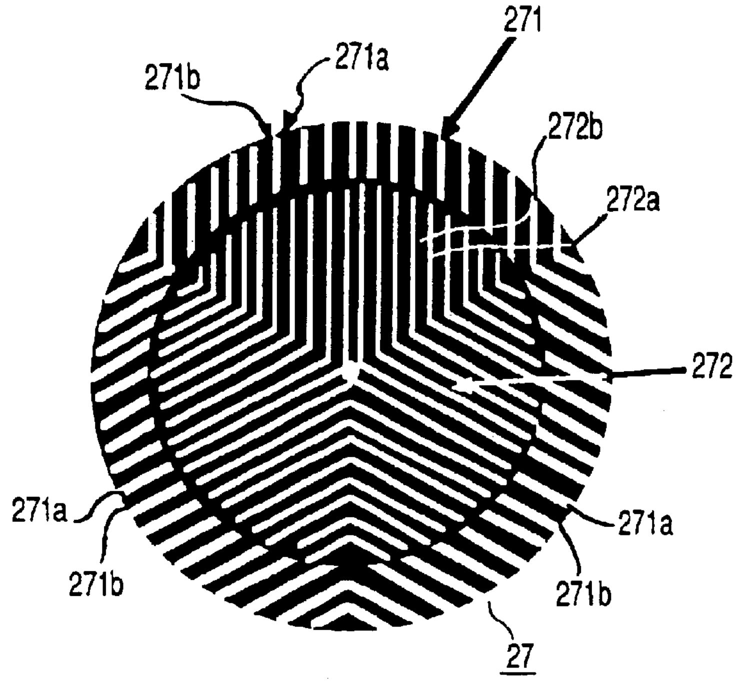
FIG. 17 shows a rotation disk in a tenth embodiment of the present invention.

FIG. 17 illustrates the configuration of the tenth embodiment of the present invention. This embodiment is a pattern modification of the rotation disk of the eighth embodiment, only pattern portions will be described, and description of parts similar to the eighth embodiment will be omitted.

The rotation disk 27 of this embodiment is divided by 120 degrees in the circumferential direction of the rotation disk 27 so that there is no potion where the straight patterns becomes parallel to the rotation disk scanning direction in the observation field when the rotation disk 24 rotates, among straight patterns of the rotation disk as shown in FIG. 17.

Straight pattern translucent section 272*a*, shield section 272*b* can be disposed on the light path in the area 6, allowing to respond to a low magnification objective.

Similarly to the eighth embodiment, in the case when the sample image is desired to be observed using the area 6 on the inner circumference side of the rotation disk 27, objectives 7 different in magnification or number of aperture can be adopted, only by moving the rotation disk 27, without exchanging the rotation disk 27, by moving the rotation disk 27 connected to the motor 16 in the arrow direction as shown in FIG. 12.

The sectioning image can be obtained without producing uneven brightness, because there is no straight pattern becoming in parallel with the rotation disk scanning direction in the observation field of the rotation disk 27. Further, in this embodiment, patterns can be prepare precisely at a low cost, because, there are nothing but straight line patterns.

(Eleventh Embodiment)

Figure 18:
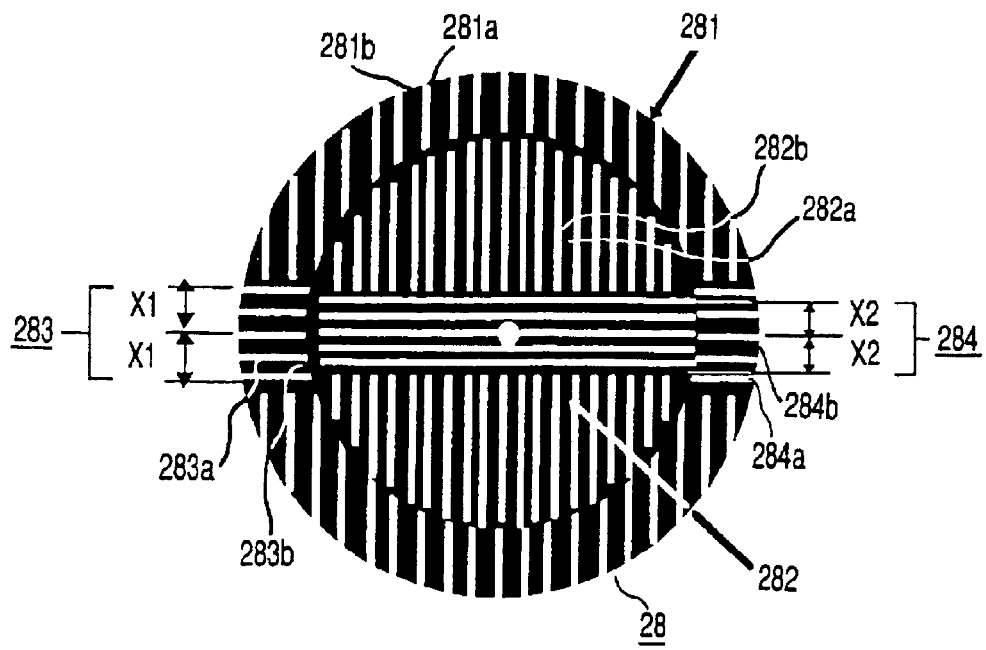
FIG. 18 shows a rotation disk in an eleventh embodiment of the present invention.

FIG. 18 illustrates the configuration of the eleventh embodiment of the present invention. This embodiment being a pattern modification of the rotation disk of the eighth embodiment, only pattern portions will be described, and description of parts similar to the eighth embodiment will be omitted.

For the rotation disk of this embodiment, there are provided areas 283 (or areas 284) having a plurality of straight patterns constant in diameter X1 (or X2) of translucent section 283*a* (or 284*a*) placed orthogonal to the direction of the straight patterns of translucent sections 281*a* (or 282*a*) and shield sections 281*b* (or 282*b*) in the portion where the straight patterns of translucent sections 501*a* (or 502*a*), shield sections 281*b* (or 282*b*) of the rotation disk 28 become parallel to the scanning direction by the rotation of the rotation disk as shown in FIG. 18.

For instance, FIG. 11 shows the result of calculation of the angle θ, supposing that, in the area 7, translucent section width be 6 μm, shield section width 54 μm, distance from rotation disk 28 center R and uneven brightness 1%. Longer is the distance R, smaller is θ, and in FIG. 18, given X1=R×sin θ for the width X1, it becomes substantially a constant value, allowing to make the uneven brightness in the observation field to a fixed value or less, thereby to perform an satisfactory sample observation.

Similarly, the width of X2 of the area 8 can be determined from the proportion of dimension width to the translucent section 282*a* and shield section 282*b*.

Similarly to the eighth embodiment, when the sample image is desired to be observed using the area 8 on the inner circumference side of the rotation disk 28, objectives 7 different in magnification or number of aperture can be accommodated, only by moving the rotation disk 28, without exchanging the rotation disk 28, by moving the rotation disk 28 connected to the motor 16 in the arrow direction.

In addition, the formation of straight patterns such as the area 283 allows to obtained the sectioning image without producing uneven brightness, Further, in this embodiment, patterns can be prepare precisely at a low cost, because, there are nothing but straight line patterns.

In the respective aforementioned embodiments, examples wherein different directions of straight line patterns are disposed at right angles each other were shown; however, it is unnecessary to be always 90 degrees. The angle in respect to the rotation disk rotation direction may be any degrees provided that being larger than θ which is a degree calculated by the uneven brightness.

(Twelfth Embodiment)

Now, the twelfth embodiment of the present invention will be described.

In this case, as the confocal microscope to which the seventh embodiment is applied is similar to that in FIG. 12, FIG. 12 will be used. In addition, disk pattern of this embodiment being similar to that in FIG. 18, the illustration and description thereof be omitted.

Figure 19:
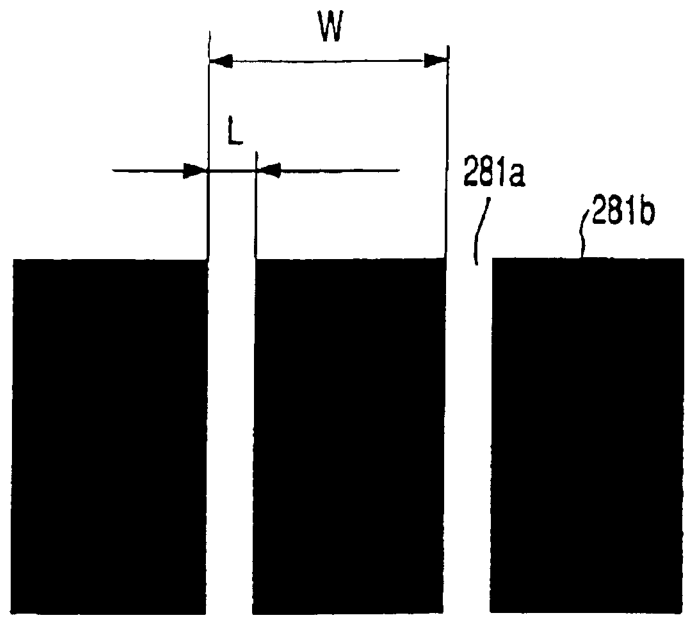
FIG. 19 is a partial enlargement view of the pattern section of the rotation disk 28 in FIG. 18.

FIG. 19 is a partial enlargement view of the pattern section of the rotation disk 28 in FIG. 18.

Now, the rotation disk pattern will be described in detail. Different direction areas where tow patters are orthogonal to the other portion are provide in a portion where the direction of straight patterns of the translucent section 281*a* (or 282*a*) and shield section 281*b* (or 282*b*) become parallel to the scanning direction in the observation field. The reduction degree of contrast stripe can be decided by the widths X1, X2 of theses different direction areas. Suppose a contrast stripe in a certain rayon on the rotation disk. For the calculation convenience, suppose the portion where patterns go straight {cross at right angles} be fan-shaped, and the half angle from the center thereof θ.

When the width of the translucent section is L and a width of the translucent section and shield section is W, from r=R when the rotation disk make half revolution, the ratio of the maximum and the minimum brightness of the reflected light in the range of r=R+W is the contrast ratio.

Suppose the rotation disk rotation angle be ϕ, the range of ϕ=−θ to θ is different in slit direction by 90 degrees.

The slit image projected on the rotation disk when a slit is projected on a sample, reflected and returned again to the rotation disk is not rectangular influence by the NA of the objective lens. Suppose a sinc function having 0 point at L, approximately. When the rotation angle of the rotation disk is ϕ, the reflected light amount V (r, ϕ) passing through the rotation disk is:

$$V(r,\phi)=\begin{cases}\sin c\left(\frac{x(r,\phi)}{L}-\frac{L}{2}\right) & x(r,\phi)\le L\\ 0 & L<x(r,\phi)\le W\end{cases} \tag{4}$$

Here, $$x(r,\phi)=r\sin\phi-L\,int\left(\frac{r\sin\phi}{L}\right)\quad -\theta<\phi<\theta \tag{5}$$

$$x(r,\phi)=r\cos\phi-L\,int\left(\frac{r\cos\phi}{L}\right)\quad \text{otherwise}$$

However, provided that int(x) is a function expression the integer portion of x.

Therefore, the light amount S (r) of the position of which distance from the center is r, is determined by integrating V by a half revolution:

$$S(r)=\int_{\frac{\pi}{2}}^{-\frac{\pi}{2}}V(r,\phi)d\phi \tag{6}$$

In the calculation of the expression (6), ϕ is −π/2 to π/2 integrated; however, in reality, the rotation disk being symmetrical to x axis y axis, a range of ϕ=0 to π/2 corresponding to a ¼ revolution is sufficient. This is calculated from r=R to R+W, and the ratio of maximum value and minimum value thereof is the contrast ratio of the moment when the portion whose slit is vertical has an angle of θ. Suppose the contrast ratio be Iratio (θ), $$I_{ratio}(\theta)=\frac{\max\left(S(r)_{r=R}^{r=R+W}\right)}{\min\left(S(r)_{r=R}^{r=R+W}\right)} \tag{7}$$

The variation thereof is determined for the range of θ=0 to π/4 (45 degrees) and the variation of contrast ratio for respective slit width and distance R from the center according to θ is calculated for judging how many degrees will be convenient as θ. If the angle θ is converted into the width X of the different direction area:

$$X = R \sin \theta \tag{8}$$

FIG. 21 shows the relationship between the contrast ratio and the different direction area width X. It is a contrast ratio at the position R=25 mm and R=40 mm with the translucent section slit width L=30 μm, W=300 μm. From FIG. 21; it is understood that curbs agree each other event at R=25 mm, 40 mm. In short, the variation of contrast ratio is decided by the different direction area width X independently of R provided that L and R are same. Larger is X, smaller is the contrast ratio; however, exceeding once a fixed value, it varies scarcely. It is around X=15 mm in case of FIG. 21.

Therefore, if the slit width L of the translucent section is 30 μm, and W is 300 μm for 232 of FIG. 19, X2=10 mm may be set.

Next, suppose both L and W are larger. FIG. 22 shows the calculation results for L=60 μm, W=600 μm. FIG. 22 shows a prominent relief around X=20 mm; however, the contrast ratio varies scarcely around 20 to 25. This corresponds to a position about two times compared to FIG. 21. In other words, if L:W does not change, it is understood that it is enough to double the value of X, when W has doubled. Suppose L=60 μm, and W=600 μm for 231 of FIG. 19, X1=20 mm may be set.

The foregoing shows that, among the translucent section slit width, cyclic width L of translucent section and shield section, and different direction area width X, there is a law saying "suppose the duty ratio L/W be constant, X is proportional to W".

Figure 20:
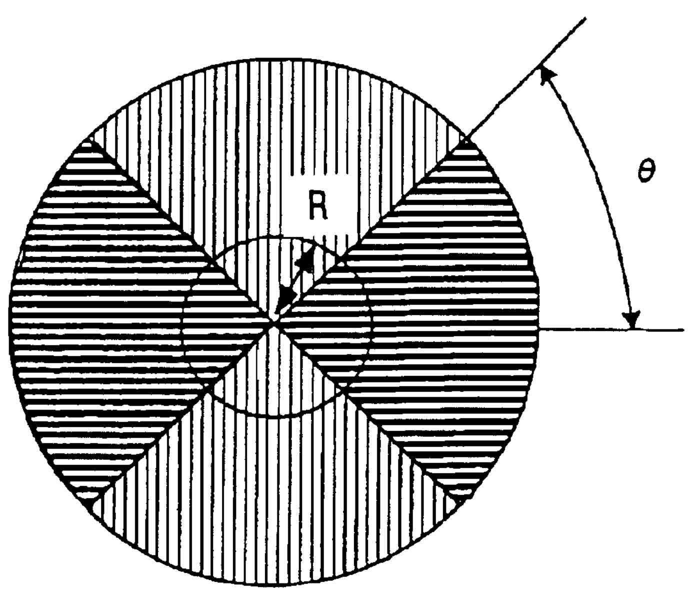
FIG. 20 illustrates a twelfth embodiment of the present invention.

However, an upper limit is applied to the magnitude of X, by the distance R from the rotation disk center. The examination of FIG. 20 shows that when the angle θ is equal or superior to 45 degrees, then, the pattern area in the orthogonal direction becomes narrower. In short, the maximum value of X is:

$$X \leq R \sin\frac{\pi}{4} \tag{9}$$

As X is proportional to W, if a pattern responding to a plurality of objective is desired with L:W constant, the translucent section larger in the slit width L should be disposed outside the circle as shown in FIG. 18.

For the rotation disk of this time, as the slit width is different for inside and outside two bands as shown in FIG. 18, it will be enough to dispose the smaller slit width inside, and the lager slit width outside.

As mentioned above, it was made possible to observe a good quality confocal image, even when observed changing the area, because it was made possible to select a pattern matched with the objective magnification or number of apertures from a plurality of areas arranged concentrically on the rotation disk 28, and at the same time, it was made possible to decide appropriately the width X of the different direction area orthogonal to the pattern for avoiding contrast strips provided in each area by the pattern cycle W. Further, if the translucent section slit width L and its cycle W are constant, it is enough to design so that said width X of the different direction area is in proportion to W, making unnecessary to create a trial pattern to decide its the different direction area, and reducing time and cost.

(Thirteenth Embodiment)

Figure 23A:
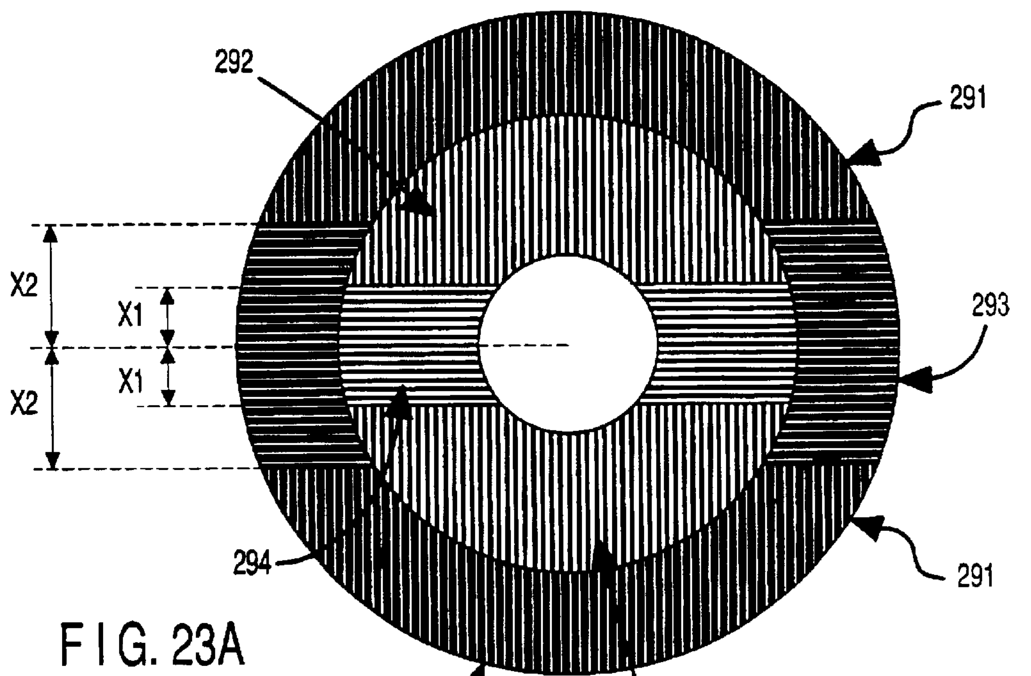
FIG. 23A and FIG. 23B show a rotation disk in a thirteenth embodiment of the present invention.
Figure 23B:
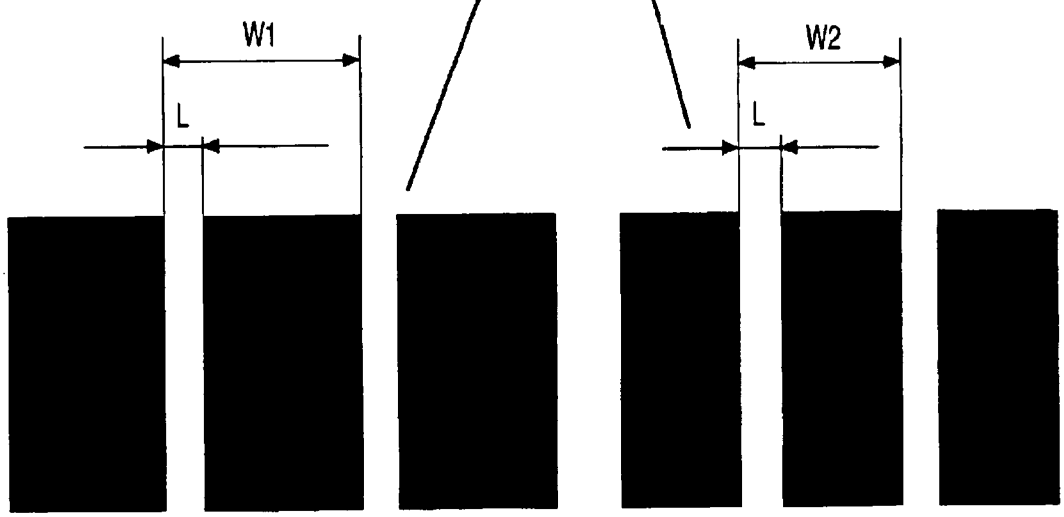

FIG. 23A and FIG. 23B illustrate the configuration of the thirteenth embodiment of the present invention. This embodiment being a pattern modification of the rotation disk of the eleventh embodiment, only pattern portions will be described, and description of parts similar to the eleventh embodiment will be omitted.

For the rotation disk of this embodiment, a rotation disk 29 is divided into two concentric areas as shown in FIG. 23A, and the translucent section slit width L is identical for outside areas 291, 293 and inside areas 292, 294, and the cycle W1 of outside translucent section and shield section and the inside cycle W2 are made different in width as shown in FIG. 23B. A different direction area 293 is disposed outside 2×1 in width, a different direction area 294 is disposed inside with its width 2×2, and patterns of this portion are orthogonal to the other portion.

According to this embodiment, in the case when the sample image is desired to be observed using the area 8 on the inner circumference side of the rotation disk 29, different patterns can be selected, only by moving the rotation disk 29, without exchanging the rotation disk 29, by moving the rotation disk 29 connected to the motor 16 in the arrow direction. Different from the fourteenth embodiment, the slit width is of the same value inside and outside, but the cycle thereof is different.

When a sample is observed, sometimes the brightness takes priority over the Z resolution, by reducing the confocal effect. As it is known that higher is W/L, better is the confocal effect (Z resolution), in a case as the forgoing, the observation can be performed by simply changing the brightness and confocal effect be executing the aforementioned changeover, by changing the ratio of L and W inside and outside as in this embodiment.

In this embodiment, the slit width L is identical, and only the cycle W is different for two areas 291, 292. The relationship of width X of the different direction area for such case will be shown.

Suppose the translucent section slit width L=30 μm, its cycle W1=150 μm. As in the eleventh embodiment, FIG. 24 shows the calculation results of the relationship between the contrast ratio and the different direction area width X. From FIG. 24, it is understood that the contrast ratio varies little approximately when X=5 mm is exceeded. Compared to FIG. 21 where W is double as W=300 μm for the same L, the contrast ratio becomes substantially a fixed value at the position where X is double. In order to confirm this, FIG. 25 shows the calculation results of the contrast ratio with an extremely large W as W=1200 μm for the same L=30 μm. Here, the contrast ratio varies scarcely around X=40 to 60 mm, and it is understood that the value of X is four times higher compared to W=300 μm of FIG. 21, as expected.

In short, "a width X of the different direction area making the contrast ratio a fixed value or below, regardless of 'L/W, is proportional to the pattern cycle W".

In addition, similarly to the eleventh embodiment, given the relationship of the expression (9) exists between the distance R from the rotation disk center and X, it is necessary to dispose the pattern with larger W outside. In short, "when a plurality of patterns are to be disposed on the rotation disk, it is preferable to increase the distance R from the rotation disk center, and if it is impossible, those of larger W will be arranged outside".

Therefore, in case of this embodiment, for instance, it can be set as follows:

Inside: L=30 μm, W=150 μm

Outside: L=30 μm, W=300 μm.

As mentioned above, it was made possible to observe images with different confocal effect and brightness, without changing the rotation disk, because it was made possible to select a pattern of the same slit width L and different cycle width L from a plurality of areas arranged concentrically on the rotation disk 29, and at the same time, it was made possible to observe a good quality confocal image, even when observed changing the area, because it was made possible to decide appropriately the width X of the different direction area orthogonal to the pattern for avoiding contrast strips provided in each area by the pattern cycle W. Further, if the translucent section slit width L and its cycle W are constant, it is enough to design so that said width X of the different direction area is in proportion to W, making unnecessary to create a trial pattern to decide its the different direction area, and reducing time and cost.

In the embodiment, it was proposed to dispose two areas in the inner circumference side and the outer circumference side of the rotation disk 29: however, if the area is contained within the observation field, three or more pattern areas corresponding to respective objective 7, or different in Z resolution, may be disposed concentrically on the rotation disk 29.

(Fourteenth Embodiment)

Now the fourteenth embodiment of the present invention will be described.

FIG. 26 shows a schematic configuration applied to the confocal microscope according to the fourteenth embodiment, and the same symbol is affected to the same portion as FIG. 4. In the configuration of FIG. 12, a motor 16 is added explicitly to the configuration of FIG. 4, and the rotation disk is constituted slant to the optical axis by a predetermined angle θ. The other configuration being similar to that in FIG. 4, the detailed description thereof will be omitted.

The rotation disk 13 is slant to the plane vertical to the optical axis by an angle θ, connected to the motor 16 through a rotation shaft 12, and rotates at a fixed rotation speed. The pattern of the rotation disk 12 is usable by any rotation disk of respective embodiment as mentioned above, the description and illustration of the pattern will be omitted.

In the configuration of FIG. 26, light reflected is from the sample 8 passes through the objective 7, becomes a straight polarized light orthogonal to the incidence at the ¼ wavelength plate 6, and forms an image of the sample 8 on the rotation disk 13 through the first imaging lens 5. Among formed images, most of confocal component passes through the translucent section on the rotation disk 13, but cannot pass if not focused. Most of light of non-confocal component is absorbed by the shield section, but partially reflected. Given the permeability not 100%, light of translucence portion also is reflected partially. The component having passed through the translucence portion of the rotation disk 13 passes further through the PBS 3 and confocal component in the sample image is imaged by the CCD camera through the second imaging lens 9. On the other hand, if the reflected light passes again through the first imaging lens 5, objective 7 and passes through the translucent section of the rotation disk 13, reflected by the sample or others, it may possibly create flare deteriorating the image contrast.

Figure 27:
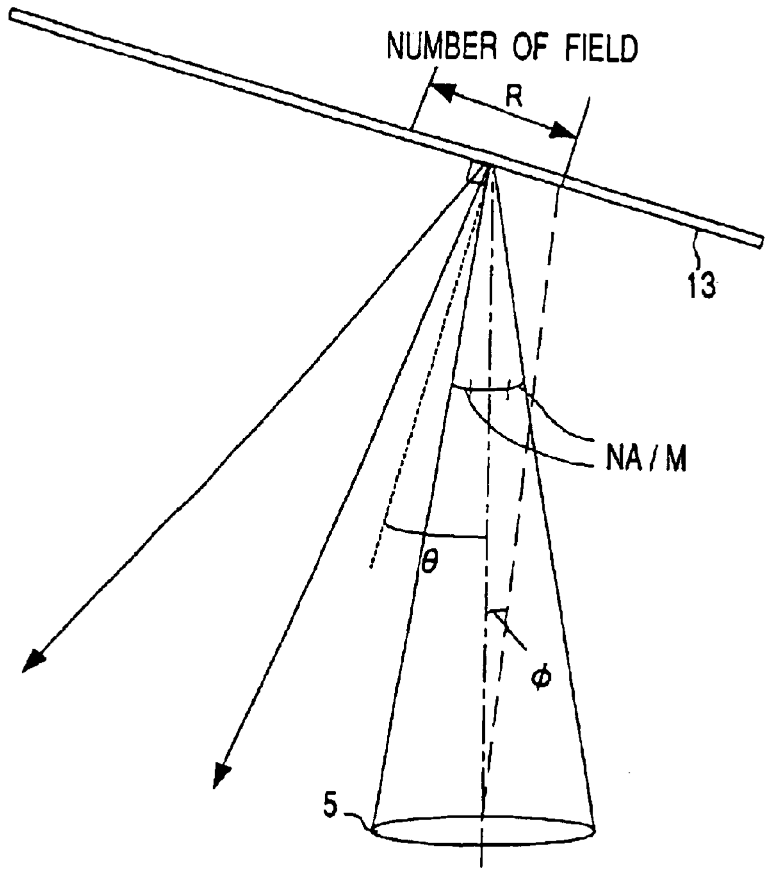
FIG. 27 is a partial enlargement view of the rotation disk and a first eyepiece.

FIG. 27 is a partial enlargement view of the rotation disk and the first objective.

The rotation disk 13 is slant to the plane vertical to the optical axis by an angle θ, and suppose the magnification of sample image projected on the rotation disk 13 be M, and the diameter of the observation field on the rotation disk 13 R; the number of apertures of the objective 7 be NA. First, the image projected on the optical axis in the center of the field. As sin of the maximum incident angle ϕ at this point on the rotation disk is the quotient of the objective NA by the magnification M, suppose the angle be small, $$\psi=NA/M$$

As the rotation disk is slant to the plane vertical to the optical axis by θ, light of said maximum incident angle ϕ is incident to the axis to the rotation disk by $$\theta\pm\psi=\theta\pm NA/M$$

when this light is partially reflected, it should be $$NA/M<\theta\pm NA/M \tag{5}$$

so that it does not enter the objective.

As all symbols are positive, eventually $$\theta>2NA/M \tag{6}$$

will be satisfied.

These are discussions about the central point of the field of view, the angle of the light to the rotation disk from the sample attains its maximum at the point at the edge of the observation field as the right side line of FIG. 27. In this case, it is necessary to add an angle ϕ between the optical path and a main optical line passing the point in the edge of the observation field to (5). Eventually, the rotation disk inclination θ condition for preventing light from the sample, if reflected from the rotation disk 13, from entering the objective 7 again will be:

$$\theta>\psi+2NA/M \tag{2}$$

These consider only the case of light from the sample, and do not refer to the flare in case of reflection of light from the light source by the rotation disk. Ordinary microscopes are designed so that the light from the light source enters, in a way to illuminate the observation filed with an even brightness, and satisfy the objective NA. The expression (2) is satisfied as it is for the light from the light source, because this condition is absolutely identical to the one for the light from the sample to form the image in a way to satisfy NA with an even brightness in the field of view of the rotation disk.

According to the expression (2), the larger the better is θ; however, it is necessary to be included within the depth of focus, in the observation field projected on the rotation disk, because it is focused on different height, when the focal plan of the sample is slant in respect to the rotation disk plan. The sample plan depth of focus zd is given approximately by the following expression with the objective NA and the wavelength λ.

$$z_d=\frac{0.9\lambda}{NA^2}$$

The depth of focus z'd of the sample image projected on the rotation disk being multiplied by $M^2$:

$$z'_d=\frac{0.9M^2\lambda}{NA^2} \tag{7}$$

It is necessary to be included within the focal depth range of the expression (7), in the observation field of the sample image projected on the rotation disk slant by the angle θ. Suppose the diameter (number of fields) on the rotation disk 13 be R, the condition of θ to be determined is:

$$\tan\theta < \frac{z'_d}{R} = \frac{0.9M^2\lambda}{NA^2R} \quad (8)$$

Suppose θ be small, the constant about 1, approximately, the condition:

$$\theta < \frac{M^2\lambda}{NA^2R} \quad (3)$$

will be satisfied.

As an example, suppose a case where the objective is M=50 [times], NA=0.9, number of field R=11 [mm]. Suppose the light wavelength λ=0.55 [μm]. As φ is given by:

$$\phi = \frac{\frac{R}{2}}{L} = \frac{5.5}{180} = 0.0306 \text{ [rad]}$$

when the depth of focus of the first objective is L, and L=180 [mm], from this and the expression (2)

$$\theta > 0.067[\text{rad}] = 3.8°$$

and, from the expression (3)

$$\theta < 0.154[\text{rad}] = 8.8°$$

therefore, it will be enough to set θ in the range of 3.8°<θ<8.8°

As mentioned above, a confocal image free from focus inclination or flare, by deciding the inclination angle θ of rotation disk 13, in correspondence to the objective magnification, number of aperture, and number of field can be obtained.

(Fifteenth Embodiment)

Now the fifteenth embodiment of the present invention will be described.

Figure 28:
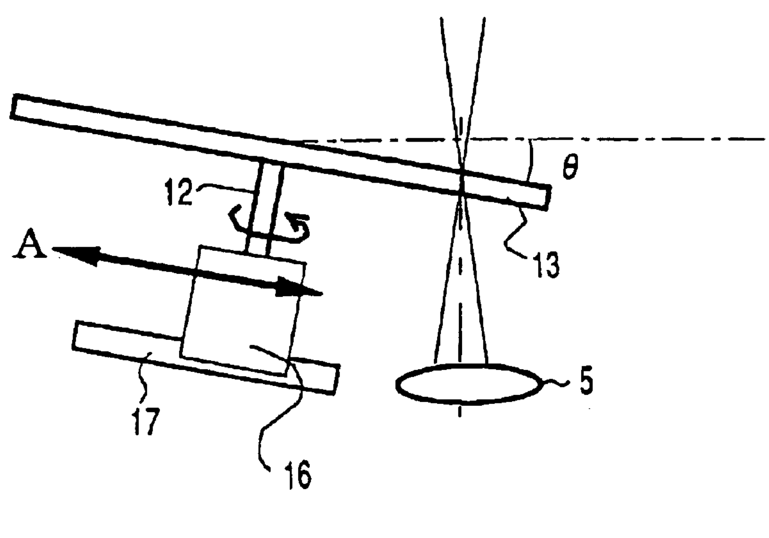
FIG. 28 shows a rotation disk in a fifteenth embodiment of the present invention.

FIG. 28 shows the configuration of the fifteenth embodiment. The same symbols are affected to the same portions as FIG. 14.

The rotation disk 13 is slant to the plane vertical to the optical axis by an angle θ, connected to the motor 16 through a rotation shaft 12, and rotates at a fixed rotation speed. As rotation disk 13, for instance, the rotation disk of the six embodiment and thereafter can be applied. The motor 16 can move the transport stage 17 in the arrow direction, keeping the angle θ, under the manual or automatic control using linear guide, ball screw, rack and pinion or others.

Now the function of this embodiment will be described. Here, as for the rotation disk, the disk 28 shown in FIG. 18 will be used.

When 100 times, NA=0.95 are adopted for the objective 7, the rotation disk is turned by the transport stage 17 connected to the motor 16, so that areas 281, 283 of the rotation disk 13 are positioned on the optical path. The function up to the imaging by the light from the light source is identical to the fourteenth embodiment. Next, when the objective 7 is changed to 30 times, NA=0.5, the areas 282, 283 disposed on the inner circumference side of the rotation disk 28 are moved by the transport stage 17 connected to the motor 16 in the arrow direction to place them on the optical path (or observation field).

Now, the rotation disk inclination at this time will be examined. The number of fields, depth of focus of the first objective, and light wavelength are the same as the fourteenth embodiment.

When the objective lens is 100 times, NA=0.95, from expressions (2) and (3):

$$2.8° < \theta < 31.7°$$

When the objective lens is 20 times, NA=0.4, from expressions (2) and (3):

$$4.0° < \theta < 7.2°$$

Consequently, it is enough to decide the angle θ, in a way to satisfy the condition for the objective of 20 times.

As mentioned above, also in the case where a plurality of patterns are provided, a good contrast sectioning image can be observed, even when the objective lens setting to the rotation disk inclination condition, from the lens characteristics used for respective pattern, is changed.

In this embodiment, two areas are disposed on the inner circumference side and the outer circumference side of the rotation disk 13: however, if the area is contained within the observation field, three or more pattern areas corresponding to respective objective, may be disposed concentrically on the rotation disk 13.

In the aforementioned embodiments, examples satisfying both expressions (2) and (3) simultaneously were shown; however, they are not always satisfied simultaneously. For instance, even when an objective lens of 20 times, NA=0.4, if the observation field is large. For instance the number of field R=25, suppose the other conditions be identical, the expression (2) will be:

$$\theta > 6.3° \quad (2)'$$

under the conditions of the expression (3):

$$\theta < 3.2° \quad (3)'$$

and it becomes impossible to satisfy (2)' and (3)' simultaneously. In such a case, it will be set to satisfy only the condition (3)' to be enter the depth of focus, without considering the flare reduction condition (2)'; while the flare will be reduced by another means such as enhancement of optical system antireflective coat, improving the polarization rate of the optical system for polarization.

(Sixteenth Embodiment)

Now the sixteenth embodiment of the present invention will be described. Different from the first to thirteenth embodiments, this embodiment uses a micro mirror in place of rotation disk.

Figure 29:
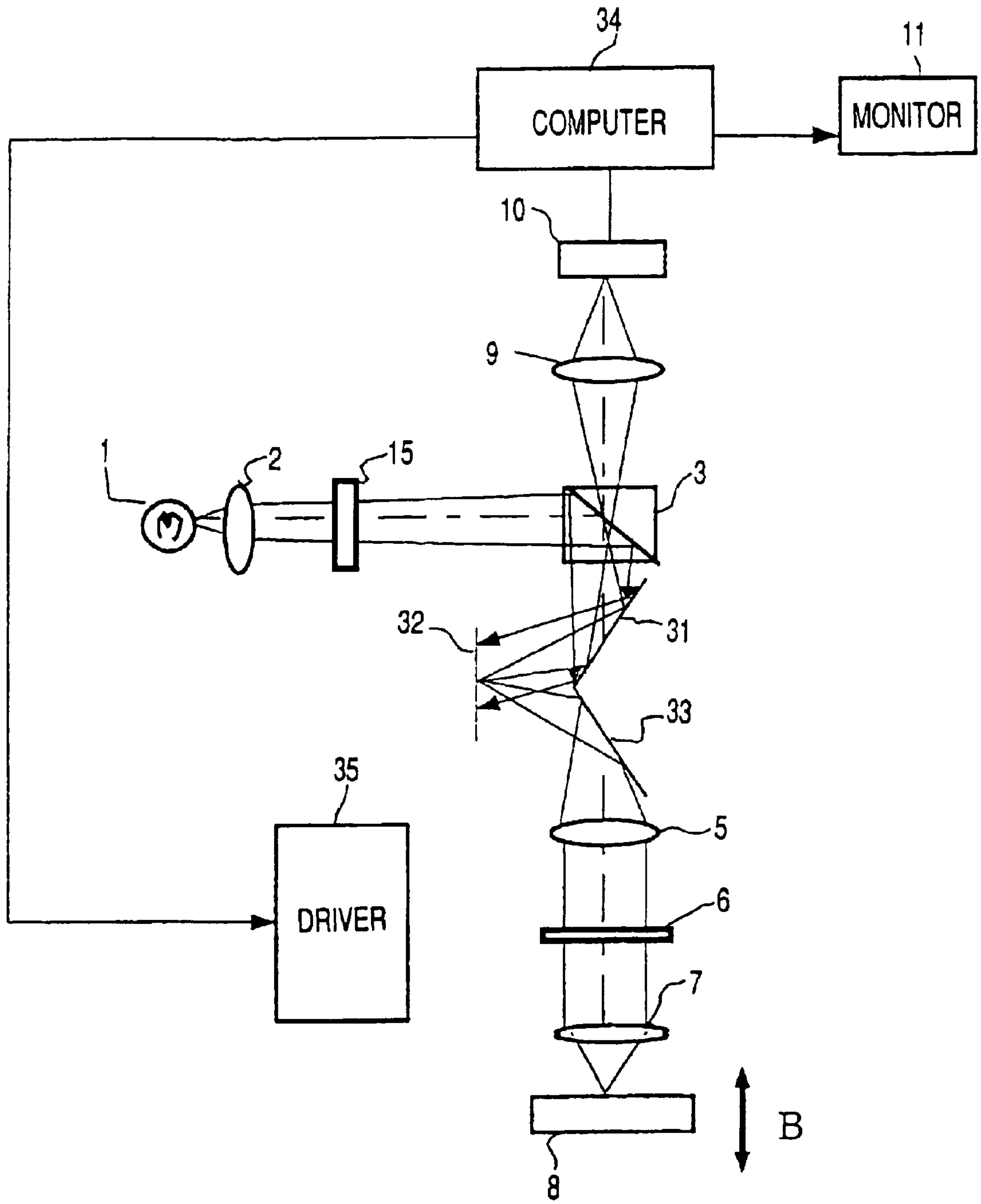
FIG. 29 shows a configuration of a sixteenth embodiment of the present invention.

FIG. 29 illustrates the configuration of the sixteenth embodiment, and the same symbol is affected to the same portion as FIG. 4, and the description thereof will be omitted.

Figure 30A:
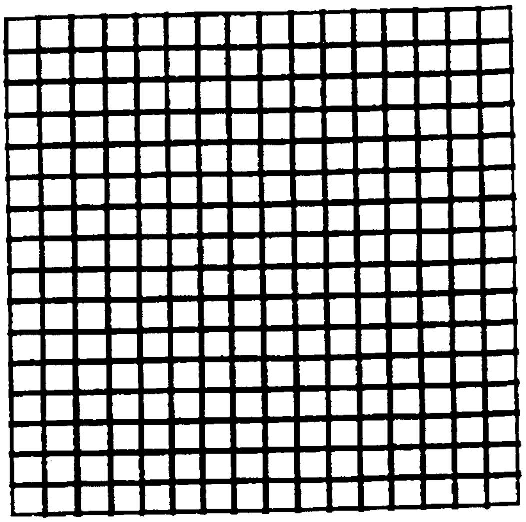
FIG. 30A to FIG. 30C show a configuration of a micro mirror array.
Figure 30B:
Figure 30C:
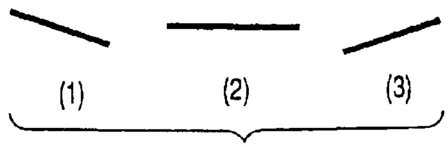

As for the micro mirror array 32 applied to the present invention, a number of mirror, each several μm to several tens of μm are arranged two-dimensionally as shown in FIG. 30A, and individual mirror is supported by two bars as shown in FIG. 30B. A different electrode is attached respectively to the individual mirror, and three states, faced to the front (2), inclined oppositely each other (1), (3), can be changed over depending on the voltage applied to the electrode as shown in FIG. 30C.

Light emitted from the light source 1 passes the optical lens 2, becomes a straight line polarized light containing only a certain polarized light at the deflecting plate 15, and enters the PBS 3. The PBS 3 reflects the polarized light in the direction passing through the deflecting plate, and permeates the polarized light in a direction perpendicular to this. Light reflected by the PBS 3 is reflected by a first mirror 31 and enters the micro mirror array 32 with an incident angle of 45 degrees. In the micro mirror array 32, light incident to the micro mirror array 32 faced to the front of FIG. 30C(2) is reflected in the direction of the second mirror 33, and light incident to the micro mirror array faced to the direction (1) or (3) of FIG. 30C is directed to the other direction. Light directed in the direction of the second mirror 33 is reflected in the direction of the first imaging lens 5 by the second mirror 33, passes through the first imaging lens 5, becomes a circular polarized light at the ¼ wavelength plate 6, is imaged by the objective 7 and enters the sample 8.

On the other hand, light reflected from the sample 8 passes through the objective 7, becomes a straight polarized light orthogonal to the incidence at the ¼ wavelength plate 6, I reflected by the first mirror 7 in the direction of the micro mirror array 32 and forms a sample image on the mirror array through the first imaging lens 5. In the micro mirror array 32, similarly as before, light incident to the micro mirror array 32 faced to the front of FIG. 30C(2) is reflected in the direction of the first mirror 31, and light incident to the micro mirror array faced to the direction (1) or (3) of FIG. 30C is directed to the other direction. At this time, as confocal image is formed on the portion faced to the front of FIG. 30C(2) and non-focused portion on the other micro mirror, only focused portion proceeds in the direction of the first mirror 31.

The focused component is reflected by the first mirror 31, passes through the PBS 3 and the sample image is formed on the CCD camera 13 through the second imaging lens 12.

Now, the actual shooting operation will be described.

The size of individual mirror of the micro mirror array 32 is supposed to be 10 μm×10 μm. As an example, suppose the objective lens be 10 times and NA=0.3. At this time, the appropriate slit width at the micro mirror array 32 position is about 10 μm from the expression (1). A period of each slit assumed to be 50 μm.

Figure 31A:
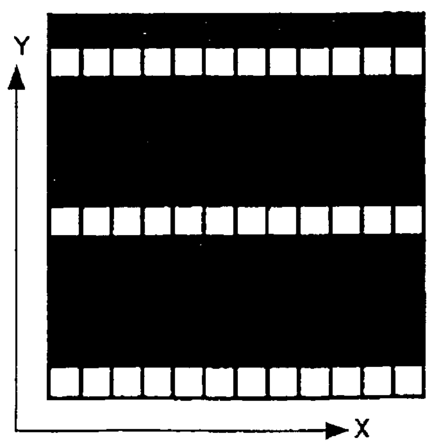
FIG. 31A and FIG. 31B show pattern examples created by the micro mirror array.
Figure 31B:
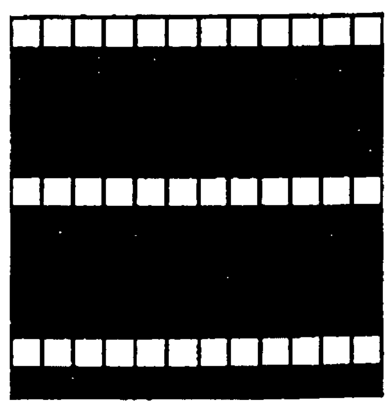

For imaging, first, a computer 34 sends a command to a driver 35, to direct the micro mirror array 32 to respective mirror as shown in FIG. 31A. In FIG. 31A and FIG. 31B, white portions are mirrors faced to the front as in FIG. 30C(2), while black portions, inclined as (3) in FIG. 30C, are directed to the second mirror 33. As the illumination light is irradiated to the sample only when the micro mirror faces to the front, as mentioned before, an image of slit light juxtaposition is projected on the sample. In this state, the computer 34 sends a command to open the shutter of the CCD camera 10, to start the exposure by the CCD camera 10.

During the exposure with the shutter open, the micro mirror pattern is shifted as follows.

First, from the state of FIG. 31A, the computer 34 sends a command to the driver 35 so that the slit light moves in Y direction of FIG. 31A by one line, or so that the micro mirror array pattern becomes as shown in FIG. 31B. If this were repeated 3 more times, the sample would have been scanned evenly; however, as it is, similarly as the slit scanning, the resolution in X direction results in being inferior to the resolution in Y direction, provoking an anisotropy. In a way to cancel, continuously, a pattern inclined by 45 degrees in respect to X as in FIG. 32A is moved in the S direction of FIG. 32A in the same manner, for scanning. Further, the scanning is performed similarly for the pattern of 90 degrees as in FIG. 32B or of 135 degrees as in FIG. 32C, the shutter is closed to finish the exposure, and the taken image is transferred to the computer 34 to display the image on the monitor 11. The aforementioned operation allows to obtain a confocal image of less anisotropy.

Now, the case of objective exchange will be examined. When the objective is 50 times, NA=0.8, the slit width being about 20 μm from the expression (1), one slit corresponds to two lines of micro mirror, and to obtain an slit interval of 100 μm with the same ratio to the slit width (duty ratio 1:5) as for the 10 times objective, it will be enough to adopt a pattern as shown in FIG. 32D. Besides, as mentioned before, a confocal image can be obtained by moving changing the pattern direction. For convenience, 12×12 micro mirror array is illustrated in the drawing; however, in reality, 500×500 or more mirrors are arranged, therefore, the confocal image can be obtained similarly for larger slits width, for instance, even for a slit width of 40 μm or so of the of a 100 times, NA=0.9 objective or the like.

Though the angle is change by 45 degrees in this embodiment, it is not necessarily to limit to this angle. 90 degrees or 30 degrees or 5 degrees will be adopted. Smaller is the angle, smaller is the anisotropy different in resolution according to the direction, it takes a long time per screen. Though the slit width to slit interval ratio is set to 1:5, it goes without saying that this value may be set arbitrarily in order to change the brightness or the Z direction resolution.

(Seventeenth Embodiment)

Figure 33:
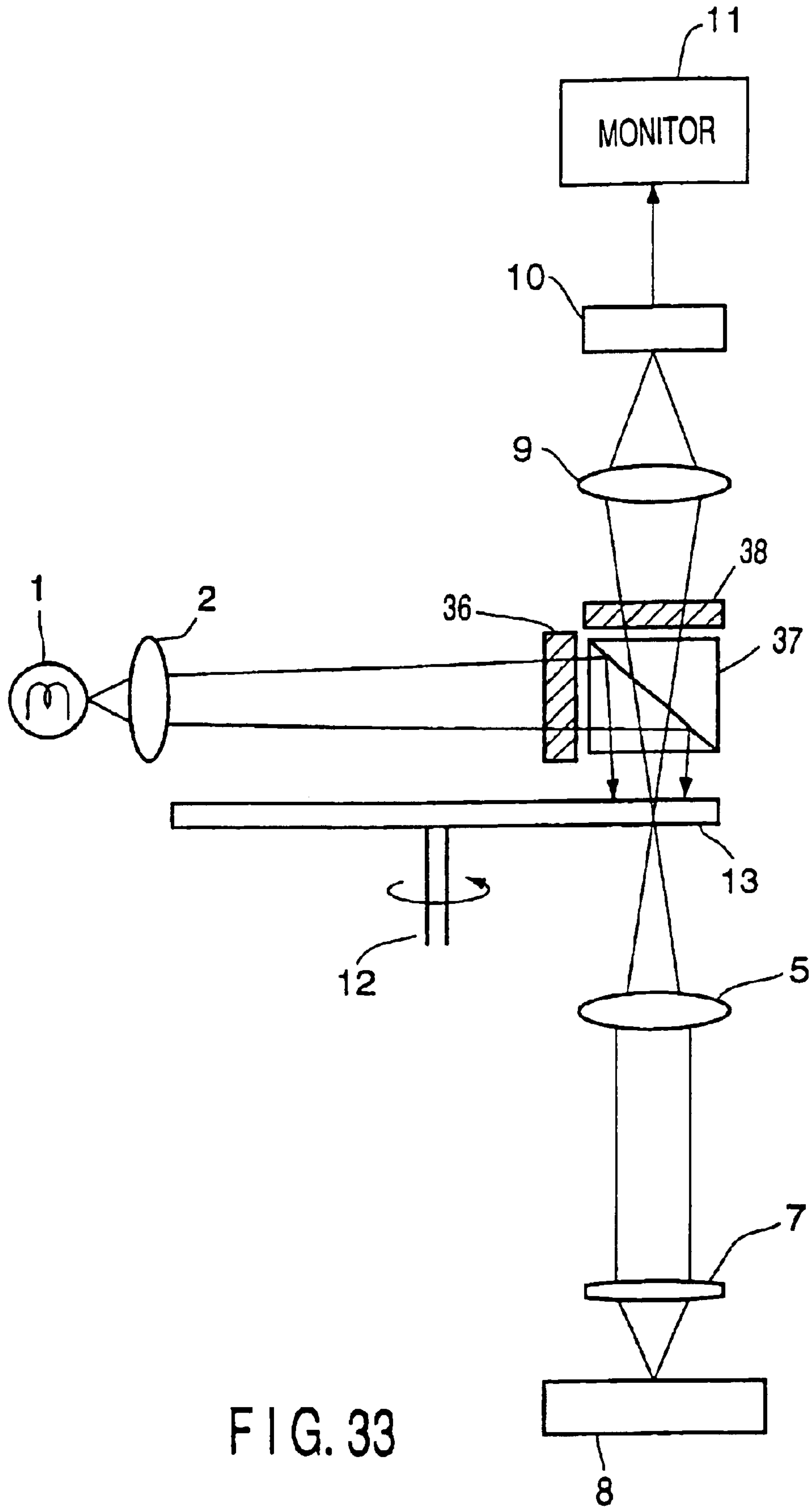
FIG. 33 shows a schematic configuration of a seventeenth embodiment of the present invention.

FIG. 33 shows a schematic configuration of the present invention applied to the confocal microscope, and the same symbol is affected to the same portion as FIG. 12.

In this case, a condenser lens 2, an excitation filter 36, and a dichroic mirror 37 are arranged on a light path of the light emitted from a light source 1 such as mercury light source or others, and a rotation disk 13, a first imaging lens 5, and a sample 8 through an objective 7 are arranged on the reflected light path of the dichroic mirror 37. In addition, a CCD camera 10 is arranged through an absorbing filter 38 and a second imaging lens 9 on the filtered light path of the dichroic mirror 37 of the light emitted from the sample 8. A monitor 11 is connected to the image output terminal of this CCD camera 10 for displaying the image taken by the CCD camera.

Here, similarly as mentioned for FIG. 5A and FIG. 5B, for the rotation disk 13, respective patterns of linearly formed translucent sections 13*a* and linearly formed shield sections 13*b* are arranged alternately, and at the same time, the width dimension of the straight shield section 13*b* is larger than the width dimension of the straight translucent section 13*a*, and set for instance to 1:9.

Figure 34:
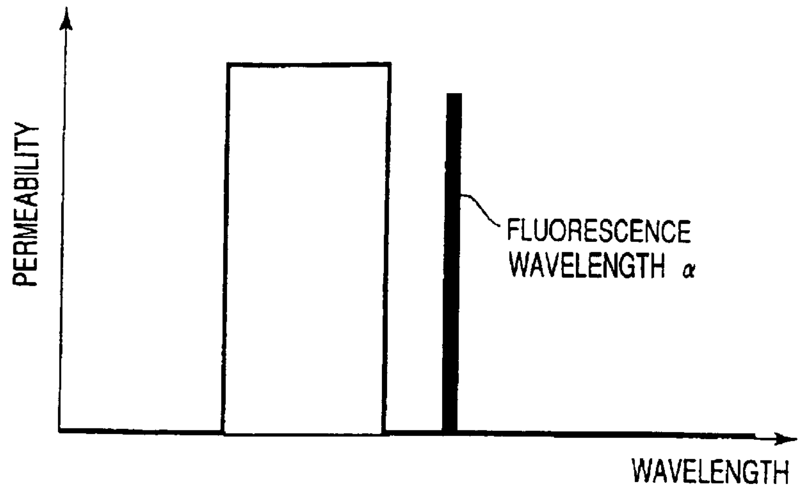
FIG. 34 shows the permeability of an excitation filter used in the seventeenth embodiment.
Figure 35A:
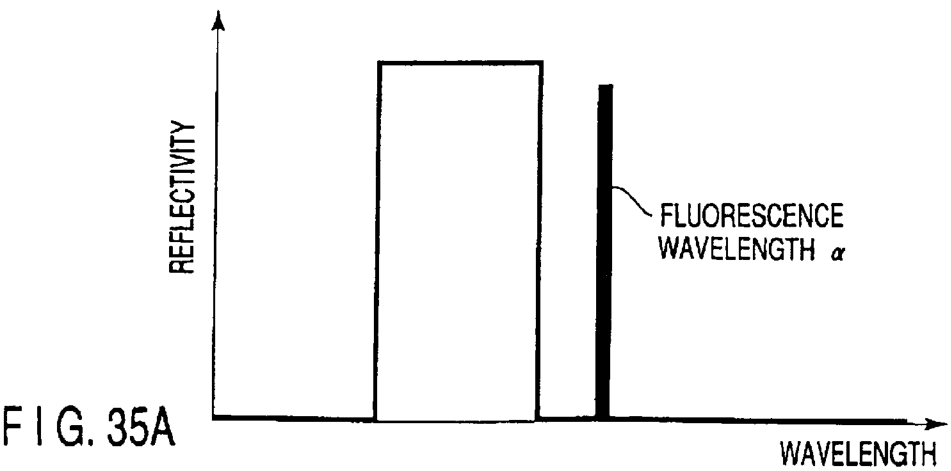
FIG. 35A and FIG. 35B show the reflectivity/permeability of PBS and absorbing filter used in the seventeenth embodiment.
Figure 35B:
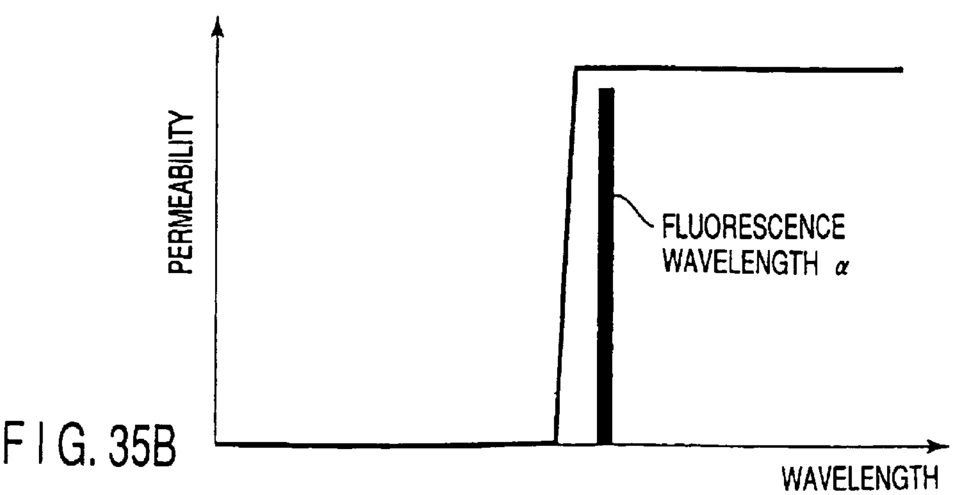

The excitation filter 36 has such translucence characteristics that the permeability attains the maximum in a wavelength band shorter than the fluorescence wavelength a as shown in FIG. 34, filters selectively a light of a predetermined frequency exciting the fluorescence, and shields light of the other wavelength. The dichroic mirror 37 has such reflection characteristics that the reflectivity attains the maximum in a wavelength band shorter than the fluorescence wavelength a as shown in FIG. 35A, reflects the light of the wavelength having passed through the excitation filter 36, has such translucence characteristics that the permeability attains the maximum in a wavelength band including the fluorescence wavelength a as shown in FIG. 35A and FIG. 35B, and filters the fluorescence wavelength emitted from the sample 8. In addition, the absorbing filter 38 has such translucence characteristics that the permeability attains the maximum in a wavelength band including the fluorescence wavelength as shown in FIG. 35B, shields the excitation wavelength having passed through the excitation filter 36 and filters the fluorescence wavelength.

The wavelength characteristics of these excitation filter 36, dichroic mirror 37 and absorbing filter 38 are different according to the fluorescent pigment to be used and, for example, in case of observing FITC, given the maximum excitation wavelength 490 nm, the maximum fluorescence wavelength 520 nm, a wavelength of 460 to 490 nm is used as wavelength for filtering the excitation filter 36 and as wavelength reflected by the dichroic mirror 37, and a wavelength of 510 nm is used as wavelength for filtering the absorbing filter 38.

In such configuration, light emitted from the light source 1 passes through the condenser lens 2, and light of fluorescence exciting wavelength is selected by the excitation filter 36, and introduced to the dichroic mirror 37. The dichroic mirror 37 reflects the light of the wavelength having passed through the excitation filter 36, and the light reflected by the dichroic mirror 37 enters the rotation disk 13 turning at a fixed speed.

Then the light having passed through the straight translucent section 13 of this rotation disk 13 passes through the first imaging lens 5, forms an image by the objective 7 and enters the sample 8. This incident light generates fluorescence from the sample 8.

Fluorescence generated from the sample 8 and reflection light passé through the objective 7, and form the sample image on the rotation disk 13 through the first imaging lens 5.

In this case, a focused portion of the sample 8 is projected in line on the rotation disk 13 in the form of product of the projected line and the sample image, and can pass the translucent section 13*a* of rotation disk 13; however, most of non-confocal image cannot pass through the rotation disk 16, because its image projected on the rotation disk 13 is also non-focused. As it is, the sample image and the pattern image are simply superposed; however, according to the rotation of the rotation disk 13, the pattern image is moved (scanned) on the sample image changing the direction, averaging them and canceling the line image, allowing to obtain a confocal image.

Then, fluorescence and reflection light having passed trough the translucent section 13*a* of rotation disk 13 enter the dichroic mirror 37 and as dichroic mirror 37 filters the fluorescence wavelength and the absorbing filter 38 also filters light of fluorescence wavelength, only the fluorescence is formed as a sample fluorescent image on the CCD camera through the second imaging lens 9 and can be observed on the monitor 11.

Therefore, in this way also, effects similar to the aforementioned first embodiment can be expected.

Note that the rotation disk used for this seventeenth embodiment is an example, and it can also be applied to the rotation disk described for respective embodiment mentioned above.

The present invention is not limited to the aforementioned embodiment, but can be modified variously without departing from the subject matter of the invention.

For example, in the fourth and fifth embodiments among respective embodiments mentioned above, the straight pattern area of other translucent section and shield section is formed in the direction orthogonal to the straight patterns of translucent section and shield section in both of them, it in not always required to be orthogonal.

In addition, though in the aforementioned embodiment, images taken by the CCD camera 10 are displayed on the monitor 11, they may be eye observed in place of CCD camera 10. Besides, a half mirror can be disposed on this side of the second imaging lens 9 and an objective on the split optical path, allowing both eye observation and CCD, or a full reflection mirror is mounted detachably to switch over both observation methods.

Further, though in the aforementioned embodiment, the width ratio of straight translucent section and shield section is set to 1:9, this ratio may be set to a larger or smaller value; when it is set to 1:3 or so, the image is brighter, but contains more non-confocal component. If it is set to 1:50 or 1:100, non-confocal component exists hardly, allowing to obtain a sectioning image constituted uniquely of confocal images can be obtained.

Still further, though in this embodiment, there is shown an embodiment where two areas are disposed on the inner circumference side and the outer circumference side of the rotation disk: however, the observation is sometimes performed by connecting an objective 7 different in magnification and number of aperture to a not shown revolver, if the area is contained within the observation field, three or more pattern areas corresponding to respective objective 7, may be disposed concentrically on the rotation disk.

Moreover, though not mentioned in the aforementioned embodiment, the three-dimensional observation can be realized by putting the sample on a Z stage, and capturing images by changing the distance between the sample 8 and the objective 7.

As mentioned before, according to the present invention, a pattern formation member applied to a sectioning image observation apparatus allowing to observe stably a quality image without making the observed image brightness uneven, and a sectioning image observation apparatus can be supplied.

As the foregoing, the present invention is appropriate for a pattern formation member applied to a sectioning image observation apparatus for observing/measuring sample microstructure or three-dimensional shape using light and a sectioning image observation apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sectioning image observation apparatus which scans a sample with a light by using a pattern formation member, and acquires a reflected light from said sample as a sectioning image through said pattern formation member, said pattern formation member comprising:

a rotation disk having a plurality of areas, wherein each of the plurality of areas comprises translucent sections and shield sections disposed alternately to form a straight pattern;

wherein all translucent sections have a same width as each other and all shield sections have a same width as each other around a same circumference of all concentric circles inscribable upon the rotation disk; and wherein the plurality of areas comprises different straight patterns which are different from each other in at least one of the width of the translucent sections, the width of the shield sections, and orientation.

2. The sectioning image observation apparatus according to claim 1, further comprising a moving mechanism which moves the rotation disk to insert or remove the rotation disk to or from an optical path.

3. The sectioning image observation apparatus according to claim 2, wherein the plurality of areas comprise areas bounded by concentric circles, and each of the plurality of areas comprises different straight patterns.

4. A sectioning image observation apparatus which irradiates an excited light with a predetermined wavelength to a pattern formation member, scans a sample with the light by using said pattern formation member, and acquires a fluorescence emitted from said sample as a sectioning image through said pattern formation member, said pattern formation member comprising:

a rotation disk having a plurality of areas, wherein each of the plurality of areas comprises translucent sections and shield sections disposed alternately to form a straight pattern;

wherein all translucent sections have a same width as each other and all shield sections have a same width as each other around a same circumference of all concentric circles inscribable upon the rotation disk; and wherein the plurality of areas comprises different straight patterns which are different from each other in at least one of the width of the translucent sections, the width of the shield sections, and orientation.

5. The sectioning image observation apparatus according to claim 4, further comprising a moving mechanism which moves the rotation disk to insert or remove the rotation disk to or from an optical path.

6. The sectioning image observation apparatus according to claim 5, wherein the plurality of areas comprise areas bounded by concentric circles, and each of the plurality of areas comprises different straight patterns.

7. The sectioning image observation apparatus according to claim 4, further comprising a barrier filter which selects a wavelength of the emitted fluorescence.

8. A sectioning image observation apparatus which scans a sample with a light by using a pattern formation member, and acquires a reflected light from said sample as a sectioning image through said pattern formation member, said pattern formation member comprising:

a rotation disk comprising:

(i) at least one area having translucent sections and shield sections disposed alternately to form a straight pattern; and (ii) at least one shield area disposed at a portion of the at least one area where the straight pattern would be parallel to a scanning direction according to a rotation of the rotation disk in an observation field to reduce uneven brightness, wherein all translucent sections of said at least one area have a same width as each other and all shield sections of said at least one area have a same width as each other along a same circumference of all concentric circles which may be inscribed upon the rotation disk; and wherein the rotation disk does not include any exclusively translucent area along a same circumference of any concentric circle which may be inscribed upon the rotation disk to include the straight pattern.

9. The sectioning image observation apparatus according to claim 8, further comprising a moving mechanism which moves the rotation disk to insert or remove the rotation disk to or from an optical path.

10. The sectioning image observation apparatus according to claim 8, wherein the plurality of areas comprise areas bounded by concentric circles, and each of the plurality of areas comprises different straight patterns.

11. A sectioning image observation apparatus which irradiates an excited light with a predetermined wavelength to a pattern formation member, scans a sample with the light by using said pattern formation member, and acquires a fluorescence emitted from said sample as a sectioning image through said pattern formation member, said pattern formation member comprising:

a rotation disk comprising:

(i) at least one area having translucent sections and shield sections disposed alternately to form a straight pattern; and (ii) at least one shield area disposed at a portion of the at least one area where the straight pattern would be parallel to a scanning direction according to a rotation of the rotation disk in an observation field to reduce uneven brightness, wherein all translucent sections of said at least one area have a same width as each other and all shield sections of said at least one area have a same width as each other along a same circumference of all concentric circles which may be inscribed upon the rotation disk; and wherein the rotation disk does not include any exclusively translucent area along a same circumference of any concentric circle which may be inscribed upon the rotation disk to include the straight pattern.

12. The sectioning image observation apparatus according to claim 11, further comprising a moving mechanism which moves the rotation disk to insert or remove the rotation disk to or from an optical path.

13. The sectioning image observation apparatus according to claim 12, wherein the plurality of areas comprise areas bounded by concentric circles, and each of the plurality of areas comprises different straight patterns.

14. The sectioning image observation apparatus according to claim 11, further comprising a barrier filter which selects a wavelength of the emitted fluorescence.

* * * * *